United States Patent
Kim et al.

(10) Patent No.: US 10,362,305 B2
(45) Date of Patent: Jul. 23, 2019

(54) IMAGE PROCESSING DEVICE, IMAGE PROCESSING METHOD, AND RECORDING MEDIUM

(71) Applicant: SONY CORPORATION, Tokyo (JP)

(72) Inventors: Jongdae Kim, Tokyo (JP); Shuo Lu, Tokyo (JP)

(73) Assignee: SONY CORPORATION, Tokyo (JP)

(*) Notice: Subject to any disclaimer, the term of this patent is extended or adjusted under 35 U.S.C. 154(b) by 106 days.

(21) Appl. No.: 15/558,290

(22) PCT Filed: Jan. 7, 2016

(86) PCT No.: PCT/JP2016/050318
§ 371 (c)(1),
(2) Date: Sep. 14, 2017

(87) PCT Pub. No.: WO2016/157924
PCT Pub. Date: Oct. 6, 2016

(65) Prior Publication Data
US 2018/0063525 A1 Mar. 1, 2018

(30) Foreign Application Priority Data
Mar. 27, 2015 (JP) .................. 2015-067082

(51) Int. Cl.
*H04N 19/11* (2014.01)
*H04N 19/176* (2014.01)
(Continued)

(52) U.S. Cl.
CPC .......... *H04N 19/11* (2014.11); *H04N 19/136* (2014.11); *H04N 19/157* (2014.11);
(Continued)

(58) Field of Classification Search
CPC ...... H04N 19/57; H04N 19/157; H04N 19/96; H04N 19/55; H04N 19/136; H04N 19/167;
(Continued)

(56) References Cited

U.S. PATENT DOCUMENTS 9,451,254 B2* 9/2016 Joshi .................. H04N 19/176
2007/0098070 A1 5/2007 Saigo et al.
(Continued)

FOREIGN PATENT DOCUMENTS

AU 2012263915 A 9/2013
CA 2837043 A1 12/2012
(Continued)

OTHER PUBLICATIONS

David Flynn "High Efficiency Video Coding (HEVC) Range Extensions Text Specification" Draft 5 JCTVC-O1005 Geneva, CH, Oct.-Nov. 2103 (Year: 2013).*
(Continued)

*Primary Examiner* — Dramos Kalapodas
(74) *Attorney, Agent, or Firm* — Chip Law Group

(57) ABSTRACT

Provided is an image processing device including: a search unit that searches for an intra-prediction mode for each prediction block included in an image to be encoded; and a control unit that determines whether a chroma format is 4:2:2 and to limit a search range of intra-prediction modes of the search unit to a predetermined range in which no upper reference pixels are referred to with respect to a prediction block of chrominance components in a case where the chroma format is determined to be 4:2:2.

11 Claims, 29 Drawing Sheets

(51) Int. Cl.
*H04N 19/593* (2014.01)
*H04N 19/136* (2014.01)
*H04N 19/186* (2014.01)
*H04N 19/167* (2014.01)
*H04N 19/174* (2014.01)
*H04N 19/96* (2014.01)
*H04N 19/157* (2014.01)
*H04N 19/55* (2014.01)
*H04N 19/57* (2014.01)

(52) U.S. Cl.
CPC ......... *H04N 19/167* (2014.11); *H04N 19/174* (2014.11); *H04N 19/176* (2014.11); *H04N 19/186* (2014.11); *H04N 19/55* (2014.11); *H04N 19/57* (2014.11); *H04N 19/593* (2014.11); *H04N 19/96* (2014.11)

(58) Field of Classification Search
CPC .... H04N 19/593; H04N 19/176; H04N 19/11; H04N 19/174; H04N 19/186; H04N 19/172; H04N 19/159; H04N 19/44
See application file for complete search history.

(56) References Cited

U.S. PATENT DOCUMENTS

| | | | | |
|---|---|---|---|---|
| 2009/0123066 A1* | 5/2009 | Moriya | ............... | H04N 19/139 382/166 |
| 2014/0003512 A1 | 1/2014 | Sato | | |
| 2015/0156499 A1* | 6/2015 | Nakamura | ........... | H04N 19/159 375/240.02 |

FOREIGN PATENT DOCUMENTS

| | | | |
|---|---|---|---|
| CN | 1956546 A | 5/2007 | |
| CN | 103583045 A | 2/2014 | |
| CN | 105103547 A | 11/2015 | |
| EP | 2717578 A1 | 4/2014 | |
| JP | 2007-124409 A | 5/2007 | |
| JP | 2013-034163 A | 2/2013 | |
| JP | 5376049 B2 | 12/2013 | |
| JP | 2014-75652 A | 4/2014 | |
| JP | 2014-075652 A | 4/2014 | |
| JP | 2014-204311 A | 10/2014 | |
| KR | 10-2014-0019388 A | 2/2014 | |
| MX | 2013013764 A | 1/2014 | |
| RU | 2013152459 A | 6/2015 | |
| TW | 201251468 A | 12/2012 | |
| WO | 2011/129163 A1 | 10/2011 | |
| WO | 2012/165039 A1 | 12/2012 | |
| WO | 2014/163200 A1 | 10/2014 | |
| WO | WO-2014163200 A1 * | 10/2014 | .......... H04N 19/159 |
| WO | 2015/005418 A1 | 1/2015 | |

OTHER PUBLICATIONS

Bross, et al., "High Efficiency Video Coding (HEVC) Text Specification Draft 10 (for FDIS & Last Call)", Joint Collaborative Team on Video Coding (JCT-VC) of ITU-T SG 16 WP 3 and ISO/IEC JTC 1/SC 29/WG 11, 12th Meeting: Geneva, CH, Jan. 14-23, 2013, 310 pages.

Flynn, et al., "High Efficiency Video Coding (HEVC) Range Extensions Text Specification: Draft 5", Joint Collaborative Team on Video Coding (JCT-VC) of ITU-T SG 16 WP 3 and ISO/IEC JTC 1/SC 29/WG 11, 15th Meeting: Geneva, CH, Oct. 23-Nov. 1, 2013, 342 pages.

Bross, et al.,"High Efficiency Video Coding (HEVC) text specification draft 10 (for FDIS & Last Call)", JCTVC-L1003_v34, Joint Collaborative Team on Video Coding (JCT-VC) of ITU-T SG 16 WP 3 and ISO/IEC JTC 1/SC 29/WG 11, 12th Meeting: Geneva, CH, Jan. 14 -23, 2013, pp. 310.

Flynn, et al., "High Efficiency Video Coding (HEVC) Range Extensions text specification: Draft 5", JCTVC-O1005_v2, Joint Collaborative Team on Video Coding (JCT-VC), of ITU-T SG 16 WP 3 and ISO/IEC JTC 1/SC 29/WG 11, 15th Meeting: Geneva, CH, Oct. 23-Nov. 1, 2013, pp. 342.

International Search Report and Written Opinion of PCT Application No. PCT/JP2016/050318, dated Feb. 9, 2016, 09 pages of ISRWO.

* cited by examiner

VERTICAL PREDICTION
(H.264/AVC)

VERTICAL PREDICTION
(HEVC)

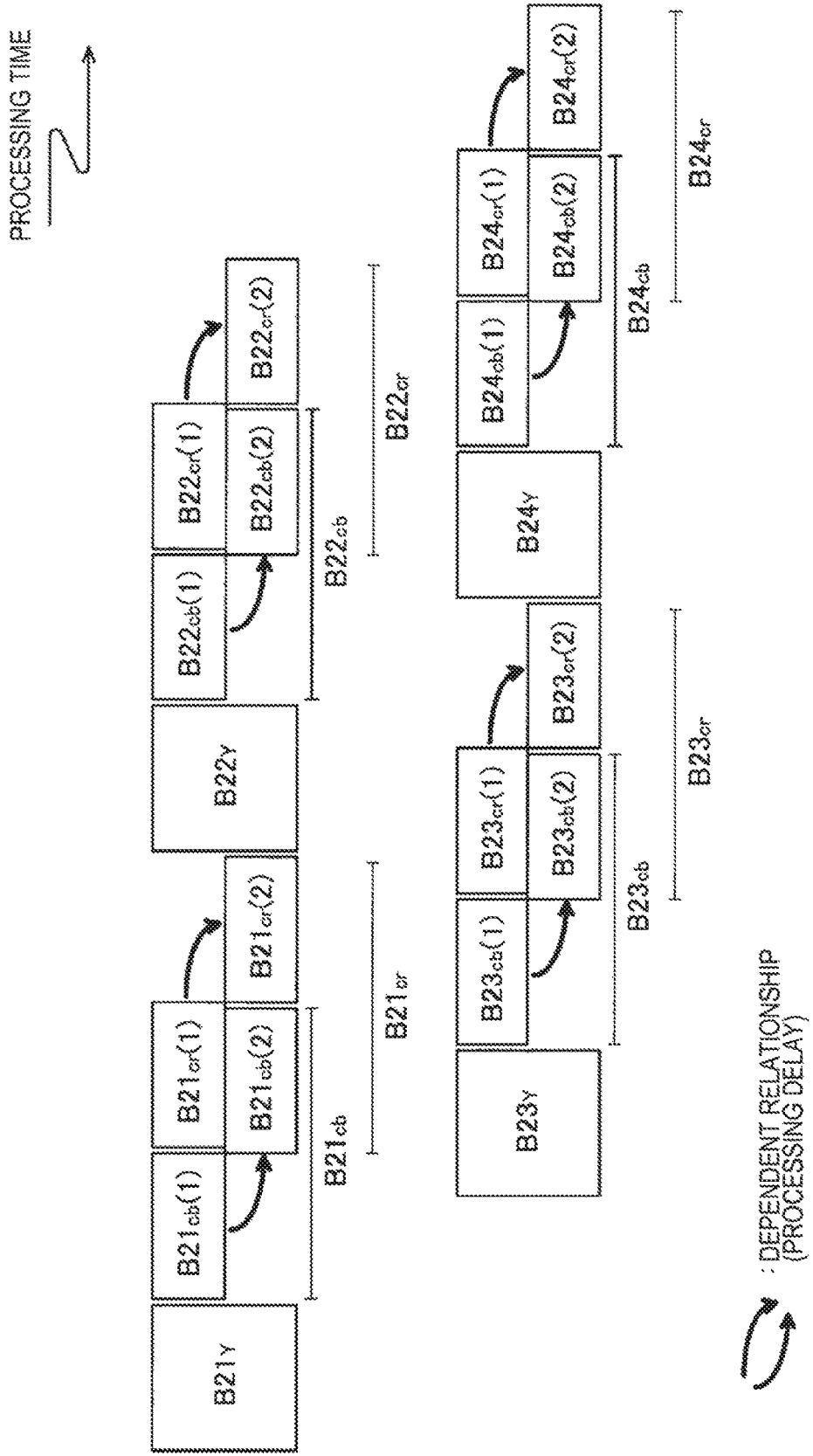

FIG. 12

| RESOLUTION | FRAME RATE (fps) | CHROMA FORMAT | LIMITATION OF SEARCH RANGE |
|---|---|---|---|
| 4096×2160 | 60 | 4:2:2 | On |
| 4096×2160 | 30 | 4:2:2 | On |
| 2048×1088 | 60 | 4:2:2 | On |
| 1920×1088 | 60 | 4:2:2 | Off |
| 2048×1088 | 30 | 4:2:2 | Off |
| ... | ... | ... | ... |

D1

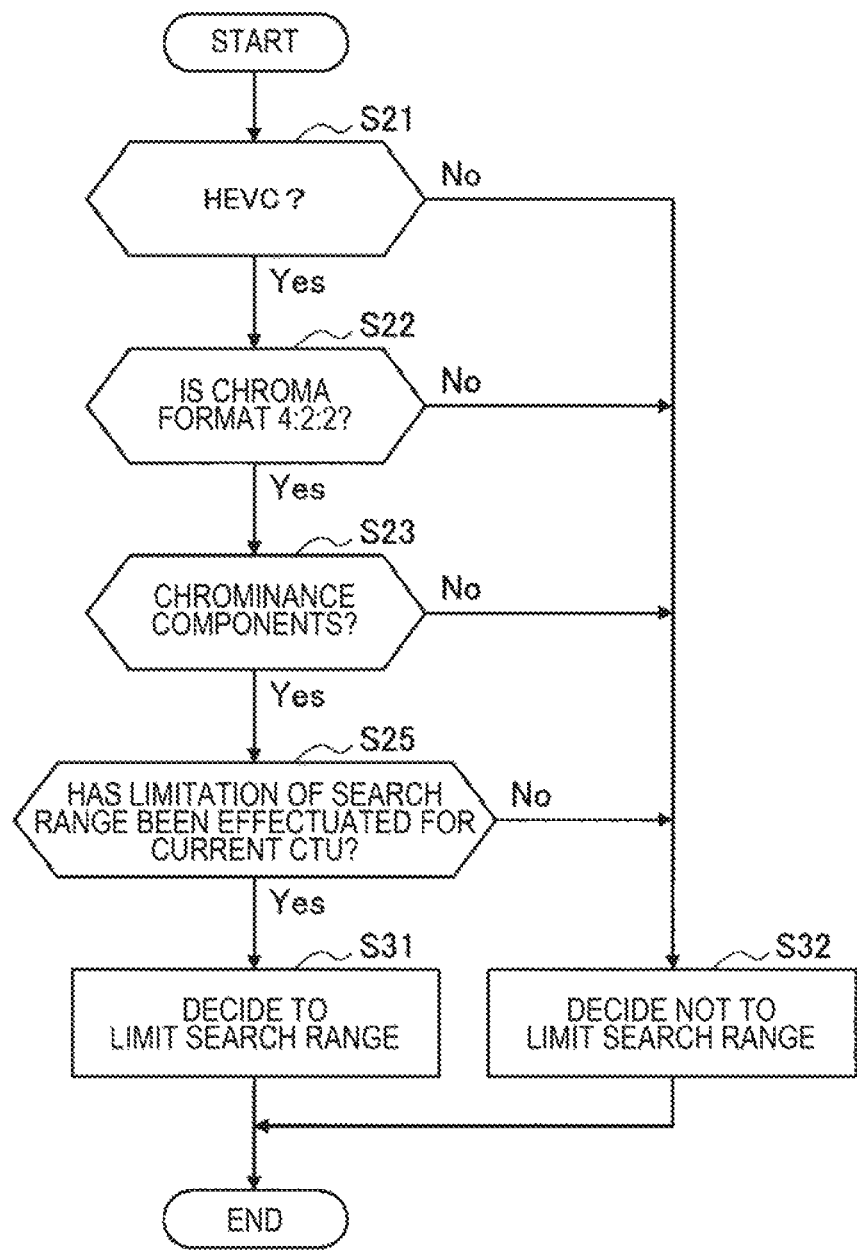

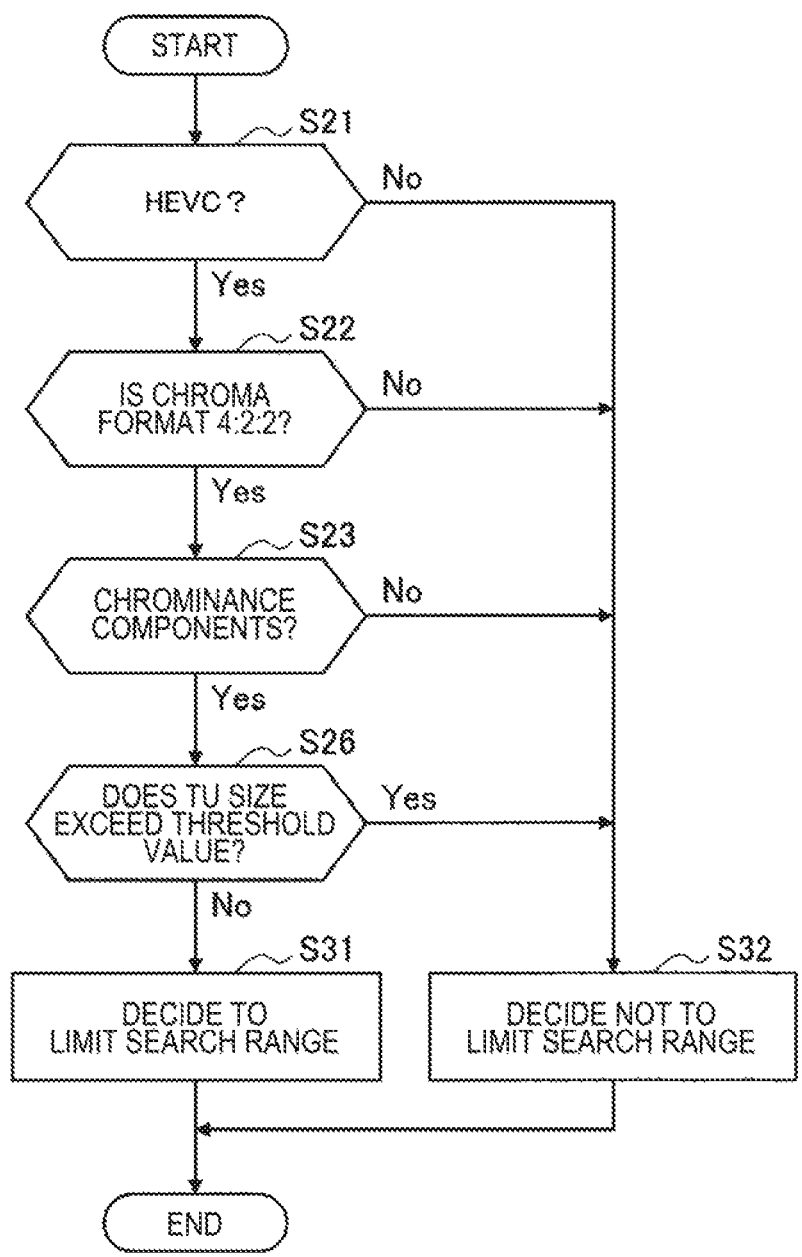

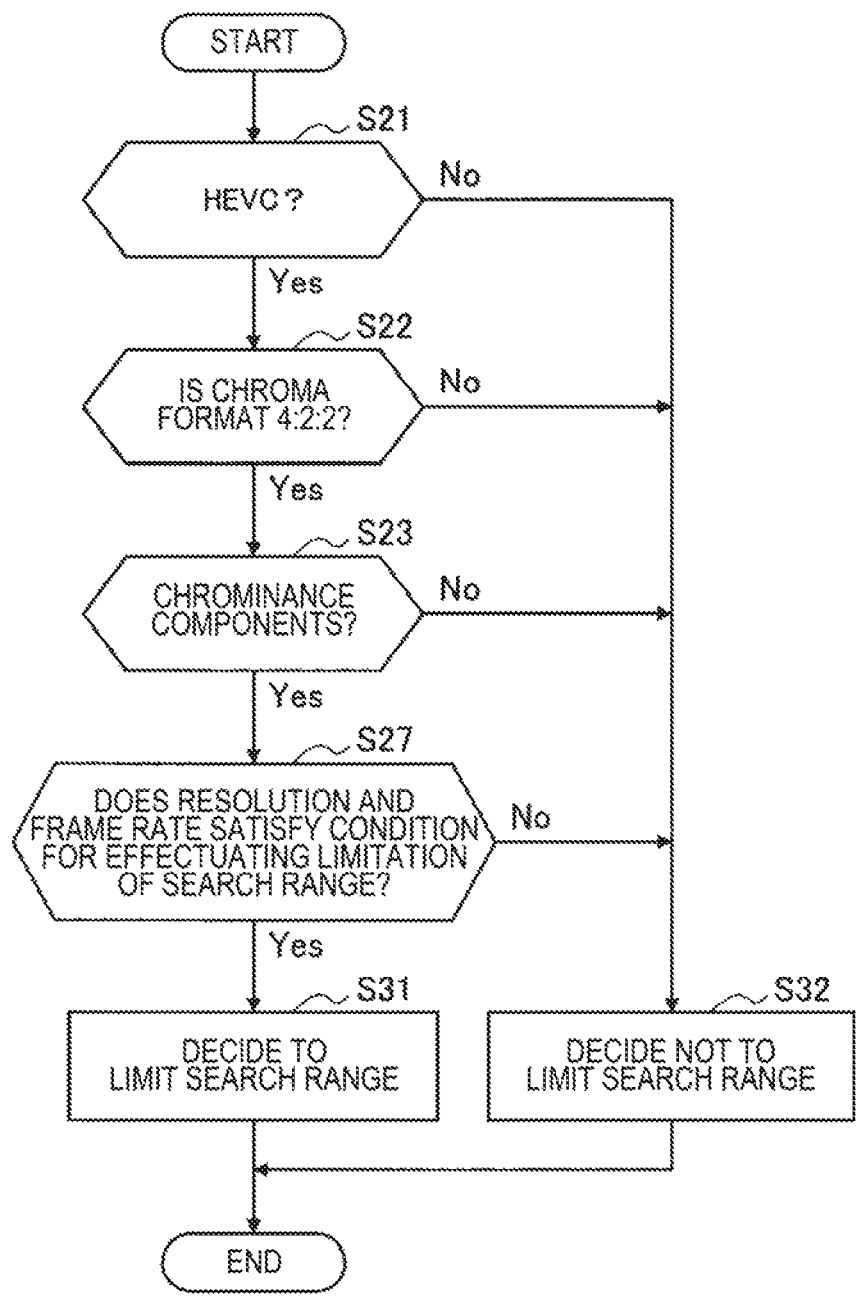

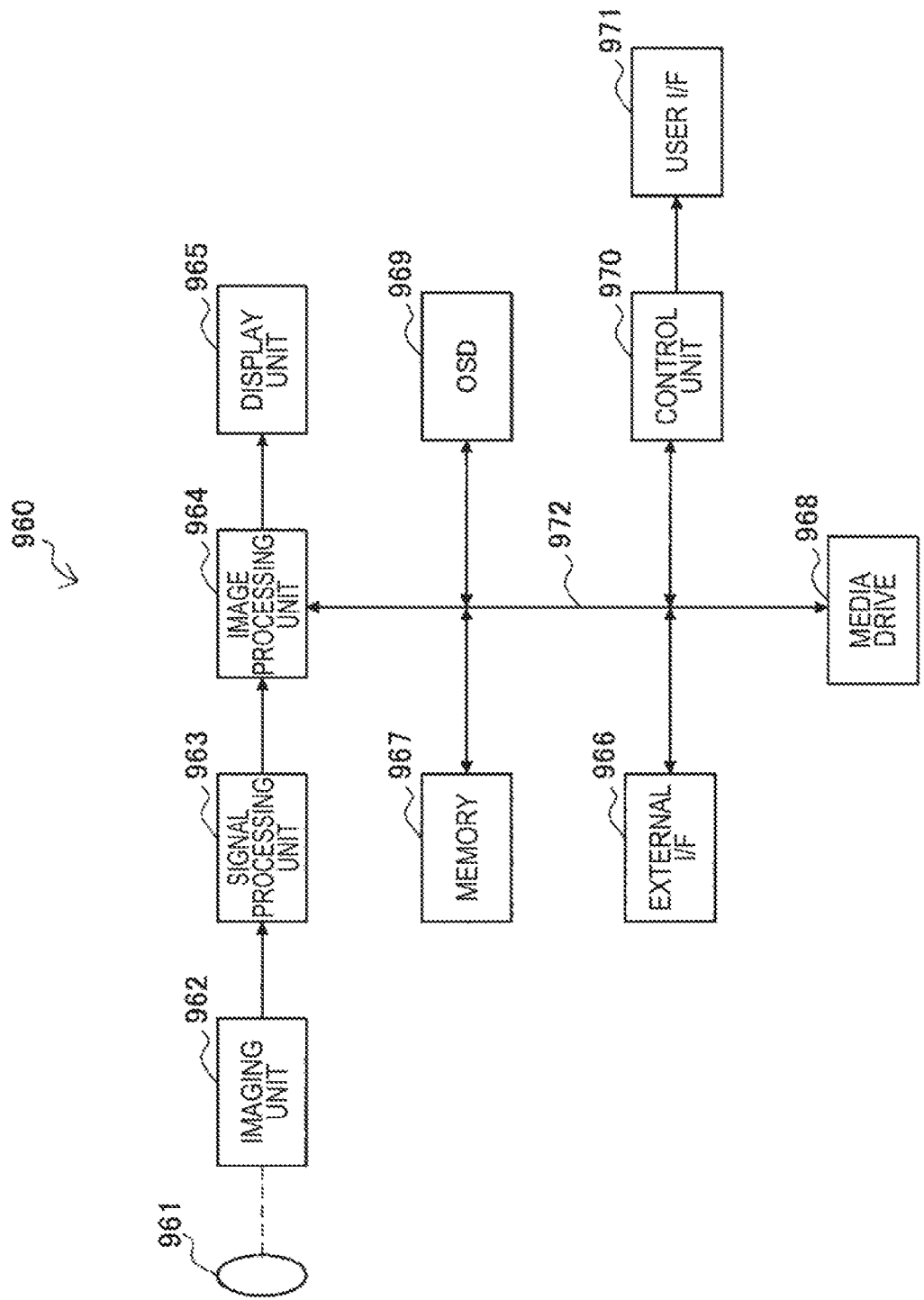

IMAGE PROCESSING DEVICE, IMAGE PROCESSING METHOD, AND RECORDING MEDIUM

CROSS REFERENCE TO RELATED APPLICATIONS

This application is a U.S. National Phase of International Patent Application No. PCT/JP2016/050318 filed on Jan. 7, 2016, which claims priority benefit of Japanese Patent Application No. JP 2015-067082 filed in the Japan Patent Office on Mar. 27, 2015. Each of the above-referenced applications is hereby incorporated herein by reference in its entirety.

Technical Field

The present disclosure relates to an image processing device, an image processing method, a program, and a recording medium.

Background Art

The Joint Collaboration Team on Video Coding (JCT-VC) which is a standardization group for the ITU-T and the ISO/IEC has led in standardization of an image coding scheme that is called high efficiency video coding (HEVC) for the purpose of improving coding efficiency over that of H.264/AVC, and the first version of the specification of the standard has been published (e.g., see Non-Patent Literature 1). Thereafter, extensions to the specification of HEVC have been continuously attempted from a variety of perspectives including enhancement of coding tools and the like (e.g., see Non-Patent Literature 2).

One of various characteristics of HEVC is improved intra-(intra-frame) prediction. Intra-prediction is a technique of reducing an amount of code in pixel information by utilizing a correlation between adjacent blocks within the same frame. In H.264/AVC, for example, directivity prediction which is applicable to about nine predictive directions can be selected as an intra-prediction mode, in addition to planar prediction and DC prediction. In HEVC, angular prediction which is applicable to about thirty-three predictive directions can be selected as an intra-prediction mode, in addition to planar prediction and DC prediction, as illustrated in FIG. 1. Prediction block sizes in HEVC are also extended more than in H.264/AVC, and a 32×32 prediction unit (PU) is also supported as well as 4×4, 8×8, and 16×16. Note that a block size of a chrominance component (Cr or Cb) is identical to or smaller than a block size of a luma (Y) component depending on a chroma format. An order of an intra-prediction process is controlled in transform units (TUs) that are set within a CU.

A chroma format is an index for specifying a ratio of a pixel density of chrominance components to a pixel density of luma components in a horizontal direction and a vertical direction. In the case where a chroma format is 4:2:0, a pixel density of chrominance components is half of a pixel density of luma components in the horizontal and vertical direction. In the case where a chroma format is 4:2:2, a pixel density of chrominance components is half of a pixel density of luma components in the horizontal direction and is equal to the pixel density of luma components in the vertical direction. That is, if a luma component block has a square shape in this case, a chrominance component block corresponding thereto has a rectangular shape having sides in the vertical direction two times longer than sides in the horizontal direction. In the case where the chroma format is 4:4:4, a pixel density of chrominance components is equal to a pixel density of luma components in the horizontal and vertical direction.

CITATION LIST

Non-Patent Literature

Non-Patent Literature 1: Benjamin Bross, el. al, "High Efficiency Video Coding (HEVC) text specification draft 10 (for FDIS & Last Call)" (JCTVC -L1003_v4, January 14 to 34, 2013)

Non-Patent Literature 2: David Flynn, el. al, "High Efficiency Video Coding (HEVC) Range Extensions text specification: Draft 5" (JCTVC -01005_v2, Oct. 23 to Nov. 1, 2013)

DISCLOSURE OF INVENTION

Technical Problem

As an example, a case in which a TU size of a luma component is 2N×2N and the chroma format is 4:2:2 is assumed. A size of a corresponding chrominance component is N×2N, and the component is practically covered by two vertically adjoining square-shaped TUs of chrominance components each having a size of N×N. In HEVC, the two TUs of chrominance components are in a dependent relationship during intra-prediction, and a delay in a prediction process caused by the dependent relationship affects encoding or decoding performance.

Thus, it is desirable to provide a mechanism which can moderate such a dependent relationship between blocks and thus improve encoding or decoding performance.

Solution to Problem

According to the present disclosure, there is provided an image processing device including: a search unit configured to search for an intra-prediction mode for each prediction block included in an image to be encoded; and a control unit configured to determine whether a chroma format is 4:2:2 and to limit a search range of intra-prediction modes of the search unit to a predetermined range in which no upper reference pixels are referred to with respect to a prediction block of chrominance components in a case where the chroma format is determined to be 4:2:2.

Further, according to the present disclosure, there is provided a program for causing a computer that controls an image processing device to function as: a search unit configured to search for an intra-prediction mode for each prediction block included in an image to be encoded; and a control unit configured to determine whether a chroma format is 4:2:2 and to limit a search range of intra-prediction modes of the search unit to a predetermined range in which no upper reference pixels are referred to with respect to a prediction block of chrominance components in a case where the chroma format is determined to be 4:2:2.

In addition, according to the present disclosure, a computer-readable recording medium on which the program is recorded is provided.

Further, according to the present disclosure, there is provided an image processing device including: a control unit configured to determine whether a search range in which an intra-prediction mode is searched for has been limited to a predetermined range in which no upper reference pixels are referred to in relation to the fact that a chroma format is 4:2:2 in intra-prediction during encoding of an image; and a generation unit configured to generate predicted images of two vertically adjoining chrominance component blocks corresponding to one luma component block in a parallel manner in intra-prediction during decoding of the image in a case where the search range is determined to have been limited to the predetermined range.

Advantageous Effects of Invention

According to the technology of the present disclosure, encoding or decoding performance can be improved as a result of moderation of a dependent relationship between blocks in intra-prediction. The above effect is not necessarily limited, and effects described in this specification or other effects that can be understood from this specification may be obtained in addition to the above effect or instead of the above effect.

BRIEF DESCRIPTION OF DRAWINGS

FIG. 4 is an illustrative diagram for describing an example of a delay in generation of a predicted image that is caused by a dependent relationship between blocks.

FIG. 12 is a table for describing an example of control of limitation of a search range on the basis of resolutions and frame rates of an image.

FIG. 14C is a flowchart showing a third example of a detailed flow of the search range decision process of the flowchart shown in FIG. 13.

FIG. 14D is a flowchart showing a fourth example of a detailed flow of the search range decision process of the flowchart shown in FIG. 13.

FIG. 14E is a flowchart showing a fifth example of a detailed flow of the search range decision process of the flowchart shown in FIG. 13.

FIG. 22 is a block diagram illustrating an example of a schematic configuration of an imaging device.

MODE(S) FOR CARRYING OUT THE INVENTION

Figure 1:
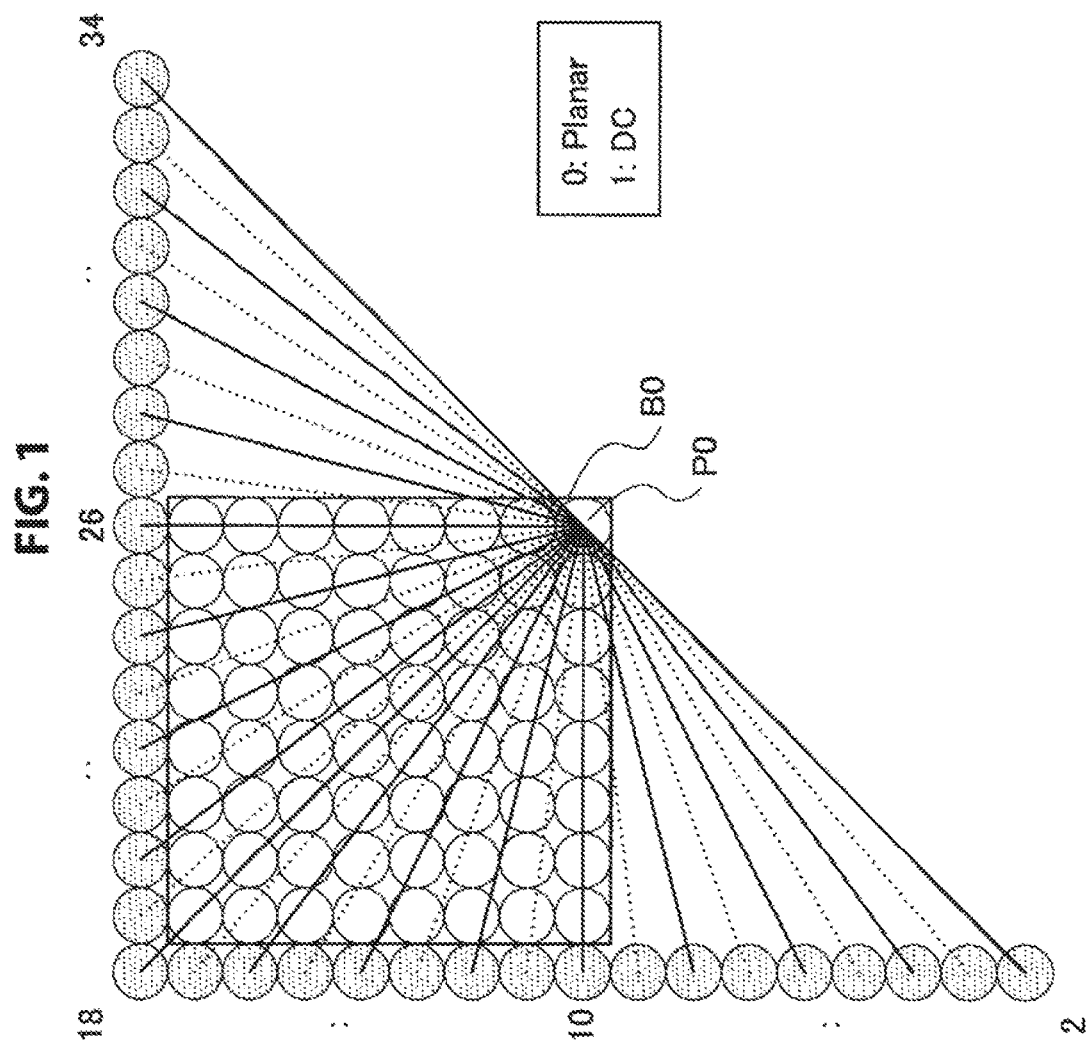
FIG. 1 is an illustrative diagram for describing a prediction mode that can be selected in intra-prediction of HEVC.

Hereinafter, (a) preferred embodiment(s) of the present disclosure will be described in detail with reference to the appended drawings. In this specification and the drawings, elements that have substantially the same function and structure are denoted with the same reference signs, and repeated explanation is omitted.

In addition, description will be provided in the following order.

1. Overview
2. Example of configuration of encoder
3. Flow of process during encoding
4. Example of configuration of decoder
5. Flow of process during decoding
6. Example of hardware configuration
7. Application examples
8. Conclusion <1. Overview>

FIG. 1 is an illustrative diagram for describing a prediction mode that can be selected in intra-prediction of HEVC. A pixel P0 shown in FIG. 1 is a pixel of interest within a block B0. Pixels with hatching around the block B0 are reference pixels. Numbers in the diagram indicate prediction mode numbers. For example, an intra-prediction mode within the range of prediction mode numbers "0" to "34" can be selected for luma components of the block B0 having a size of 8×8. The prediction mode number "0" corresponds to planar prediction. In planar prediction, a pixel adjoining the upper side and a pixel adjoining the left side of the block B0 are referred to in order to generate a predicted image. The prediction mode number "1" corresponds to DC prediction. In DC prediction, a pixel adjoining the upper side and a pixel adjoining the left side of the prediction block B0 are likewise referred to in order to generate a predicted image. The prediction mode numbers "2" to "34" each correspond to angular prediction associated with a unique predictive direction. In angular prediction, a reference signal that is determined from a predictive direction unique to a prediction mode is referred to. The prediction mode numbers "10" and "26" correspond to horizontal prediction and vertical prediction respectively.

In the case where it is attempted to generate a predicted image in a certain intra-prediction mode, a reconstructed (decoding) pixel value of a reference pixel to be referred to in the intra-prediction should have been decided. This means that adjacent blocks have a dependent relationship and a processing order thereof is controlled so as not to be inconsistent with the dependent relationship. In the example of FIG. 1, for example, decoding of a block adjacent to the left of the block B0 should be completed in order to generate a predicted image of the block B0 in horizontal prediction. Likewise, decoding of a block adjacent to the above of the block B0 should be completed in order to generate a predicted image of the block B0 in vertical prediction. In addition, such a dependent relationship between blocks can be a cause of a delay in a prediction process.

Figure 2:
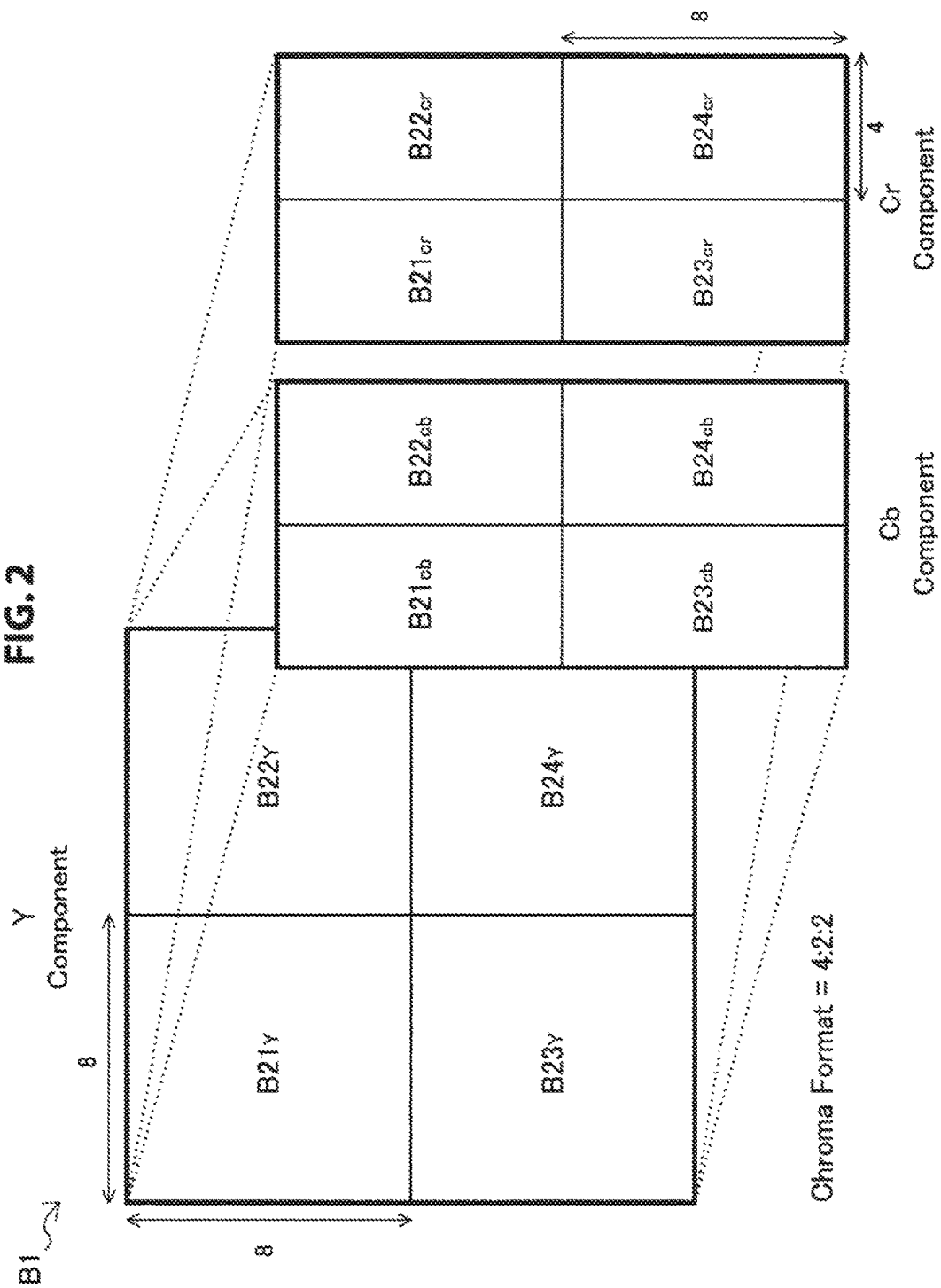
FIG. 2 is an illustrative diagram for describing a structure of a block in the case where a chroma format is 4:2:2.

FIG. 2 is an illustrative diagram for describing a structure of a block in the case where a chroma format is 4:2:2. In the example of FIG. 2, a block B1 corresponds to, for example, a coding unit (CU) and is composed of three types of color component (luma (Y) component and chrominance (Cr and Cb) components). The block B1 is divided into four blocks for each color component. Each of the blocks corresponds to, for example, a prediction unit (PU) or a transform unit (TU). For example, blocks $B21_Y$, $B22_Y$, $B23_Y$, and $B24_Y$ are luma component blocks. Blocks $B21_{Cb}$, $B22_{Cb}$, $B23_{Cb}$, and $B24_{Cb}$ are first chrominance (Cb) component blocks. Block $B21_{Cr}$, $B22_{Cr}$, $B23_{Cr}$, and $B24_{Cr}$ are second chrominance (Cr) component blocks. In the case where the chroma format is 4:2:2, a pixel density of chrominance components in the horizontal direction is equal to half of a pixel density of luma components, and a pixel density of chrominance components in the vertical direction is equal to a pixel density of luma components. Thus, if the luma component blocks have a square shape, corresponding chrominance component blocks have a rectangular shape having sides in the vertical direction two times longer than sides in the horizontal direction. Referring to FIG. 2, for example, each of the luma component blocks $B21_Y$, $B22_Y$, $B23_Y$, and $B24_Y$ has a square shape having a size of 8×8. Meanwhile, each of the chrominance component blocks $B21_{Cb}$, $B22_{Cb}$, $B23_{Cb}$, $B24_{Cb}$, $B21_{Cr}$, $B22_{Cr}$, $B23_{Cr}$, and $B24_{Cr}$ has a rectangular shape having a size of 4×8.

Figure 3A:
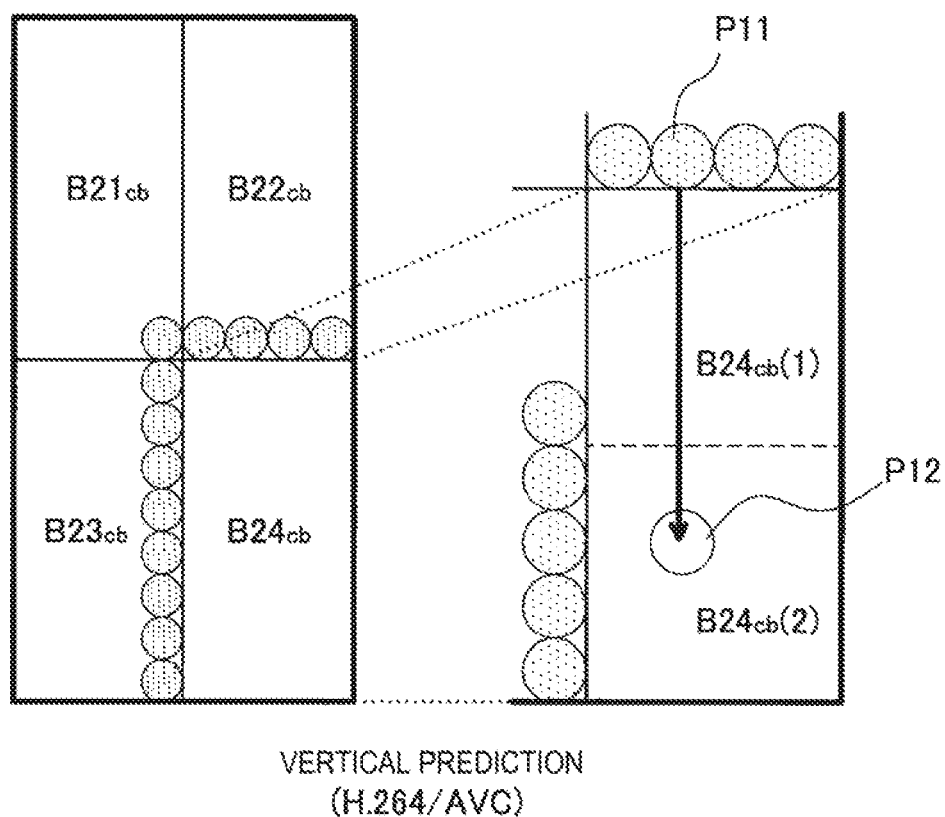
FIG. 3A is an illustrative diagram for describing an example of a dependent relationship between blocks of chrominance components in intra-prediction of H.264/AVC.
Figure 3B:
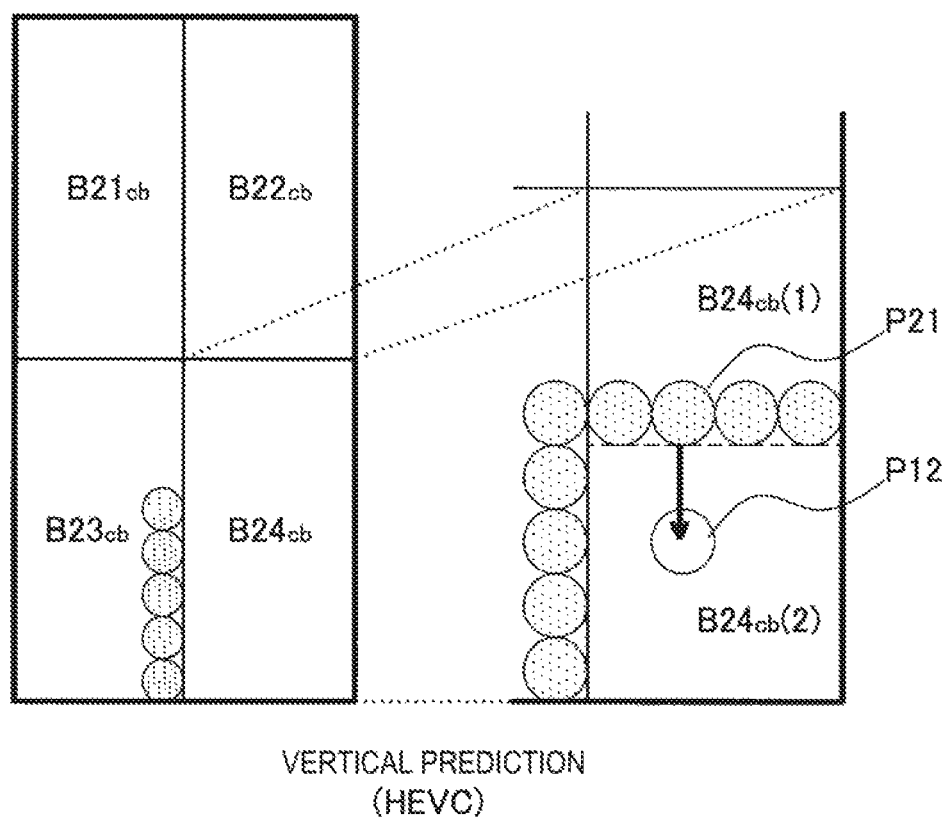
FIG. 3B is an illustrative diagram for describing an example of a dependent relationship between blocks of chrominance components in intra-prediction of HEVC.

Reference pixels used when a predicted image is generated in intra-prediction are treated in H.264/AVC differently from HEVC with respect to rectangular chrominance component blocks as shown in FIG. 2. The difference will be described using FIGS. 3A and 3B. As an example, the first chrominance component block $B24_{Cb}$ will be focused upon here. The block $B24_{Cb}$ is divided into two squares $TU24_{Cb}(1)$ and $TU24_{Cb}(2)$ each having a size of 4×4. In the case where a predicted image particularly of the $TU24_{Cb}(2)$ among these is generated in the intra-prediction mode, a pixel adjoining the upper side and a pixel adjoining the left side of the rectangle formed by $TU24_{Cb}(1)$ and $TU24_{Cb}(2)$ are treated as reference pixels in H.264/AVC as shown in FIG. 3A. For example, when a predictive pixel value of a pixel P12 is calculated in vertical prediction, a reconstructed pixel value of a reference pixel P11 is referred to. On the other hand, in the case where a predicted image of $TU24_{Cb}(2)$ is generated in the intra-prediction mode in HEVC, a pixel adjoining the upper side and a pixel adjoining the left side of the block $24_{Cb}(2)$ are treated as a reference pixel as shown in FIG. 3B. For example, when a predictive pixel value of P12 is calculated in vertical prediction, a reconstructed pixel value of a pixel P21 included in the block $24_{Cb}(1)$ is referred to.

If the chroma format is 4:2:2 when an image is encoded or decoded in the HEVC scheme as described above, blocks can have a dependent relationship which does not exist in H.264/AVC. Generally speaking, two vertically adjoining chrominance component blocks (e.g., TUs of chrominance components) corresponding to one luma component block (e.g., a TU of a luma component) have a dependent relationship. Owing to this dependent relationship, in the case where a prediction mode in which particularly an upper reference pixel is referred to is selected, a predicted image of a lower chrominance component block is generated after waiting for completion of decoding (reconstructuring) of an upper chrominance component block.

FIG. 4 is an illustrative diagram for describing an example of a delay in generation of a predicted image that is caused by a dependent relationship between blocks. Each of boxes shown in FIG. 4 represents a timing of a predicted image generation process for each block illustrated in FIG. 2, and time moves forward in the direction from the left to the right and from the upper side to the lower side of the diagram. In the example of FIG. 4, a processing order of the TU level is:
block $B21_Y \rightarrow$ block $B21_{cb}(1) \rightarrow$ block $B21_{cb}(2) \rightarrow$ block $B21_{cr}(1) \rightarrow$ block $B21_{cr}(2) \rightarrow$ block $B22_Y \rightarrow$ block $B22_{cb}(1) \rightarrow$ block $B22_{cb}(2) \rightarrow$ block $B22_{cr}(1) \rightarrow$ block $B22_{cr}(2) \rightarrow$ block $B23_Y \rightarrow$ block $B23_{cb}(1) \rightarrow$ block $B23_{cb}(2) \rightarrow$ block $B23_{cr}(1) \rightarrow$ block $B23_{cr}(2) \rightarrow$ block $B24_Y \rightarrow$ block $B24_{cb}(1) \rightarrow$ block $B24_{cb}(2) \rightarrow$ block $B24_{cr}(1) \rightarrow$ block $B24_{cr}(2)$. Processing of the first chrominance components and the second chrominance components can be performed in parallel as far as a capability of a device permits, and parallelized processing is also performed in parts in the example of FIG. 4. According to the specifications of HEVC, however, if the chroma format is 4:2:2, a processing delay occurs due to a dependent relationship between two vertically adjoining chrominance component blocks. For example, the block $B21_{cb}(2)$ is processed after the block $B21_{cb}(1)$ is processed. The block $B21_{cr}(2)$ is processed after the block $B21_{cr}(1)$ is processed. The same applies to other chrominance component blocks.

A processing delay in intra-prediction as described with reference to FIG. 4 hinders efficient utilization of processing resources of a device, and adversely affects performance of an encoder and even performance of a decoder in some cases. Thus, an embodiment that will be described in detail in the next section aims to realize improvement in performance of encoders and decoders by moderating such a dependent relationship between blocks described above. In addition, conditions for moderating a dependent relationship will be defined in several embodiments in consideration of a tradeoff between performance and image quality.

<2. Example of Configuration of Encoder>

[2-1. Overall Configuration]

Figure 5:
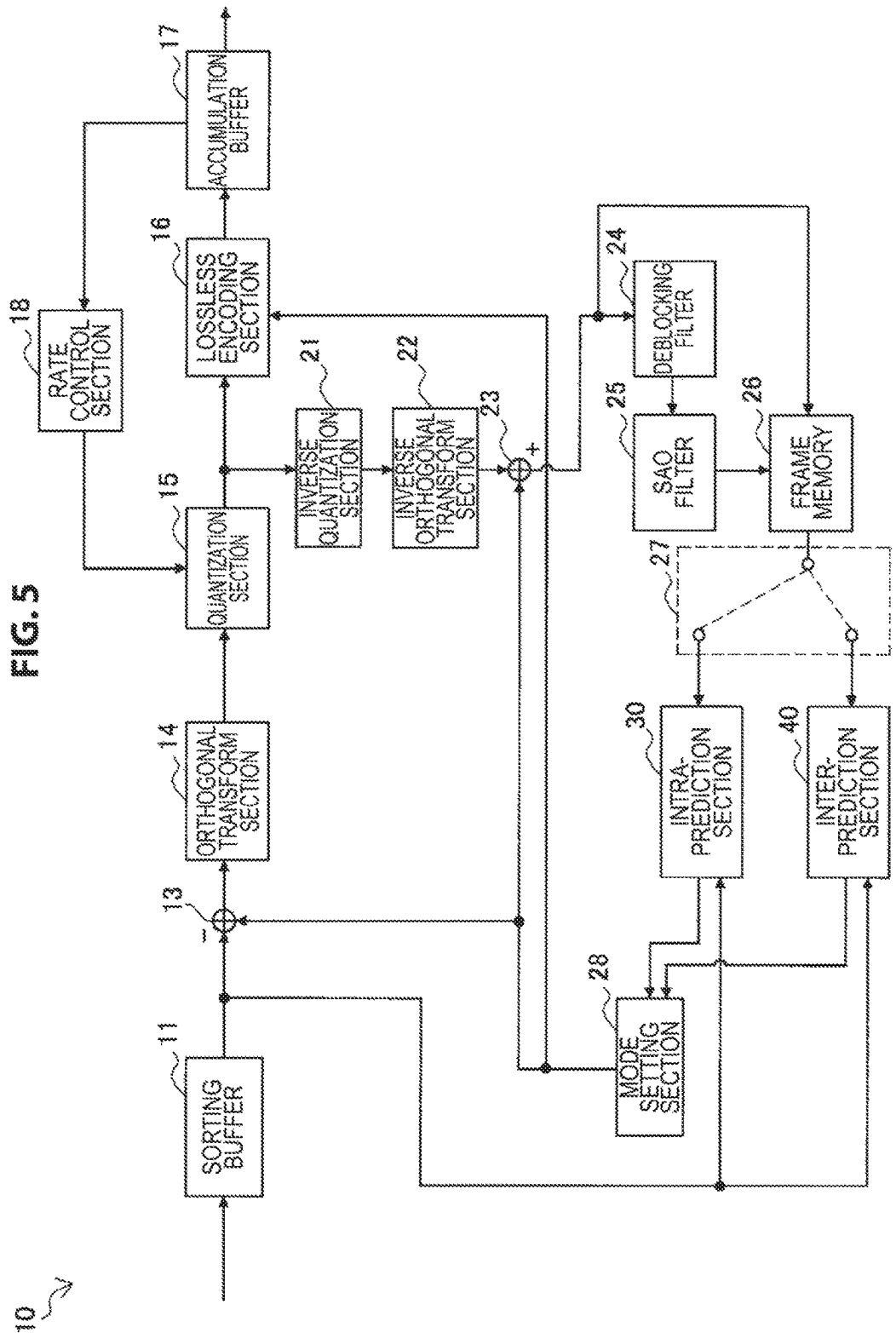
FIG. 5 is a block diagram illustrating an example of a schematic configuration of an encoder.

FIG. 5 is a block diagram illustrating an example of a schematic configuration of an encoder 10. Referring to FIG. 5, the encoder 10 has a sorting buffer 11, a subtraction section 13, an orthogonal transform section 14, a quantization section 15, a lossless encoding section 16, an accumulation buffer 17, a rate control section 18, an inverse quantization section 21, an inverse orthogonal transform section 22, an addition section 23, a deblocking filter 24, an SAO filter 25, a frame memory 26, a switch 27, a mode setting section 28, an intra-prediction section 30, and an inter-prediction section 40.

The sorting buffer 11 sorts images included in a series of image data. After sorting the images in accordance with a GOP (Group of Pictures) structure in the encoding process, the sorting buffer 11 outputs the image data which has been sorted to the subtraction section 13, the intra-prediction section 30, and the inter-prediction section 40.

The subtraction section 13 calculates prediction error data which is a difference between the image data input from the sorting buffer 11 and predicted image data and outputs the calculated prediction error data to the orthogonal transform section 14.

The orthogonal transform section 14 executes an orthogonal transform process on each of one or more TUs set within each coding tree unit (CTU). The orthogonal transform performed here may be, for example, a discrete cosine transform or a discrete sine transform. More specifically, the orthogonal transform section 14 transforms the prediction error data input from the subtraction section 13 into transform coefficient data of a frequency domain from a pixel signal of a space domain for each TU. Then, the orthogonal transform section 14 outputs the transform coefficient data to the quantization section 15.

The quantization section 15 receives supply of the transform coefficient data input from the orthogonal transform section 14 and a rate control signal from the rate control section 18 which will be described below. The quantization section 15 quantizes the transform coefficient data in a quantization step decided in accordance with the rate control signal. In addition, the quantization section 15 generates a quantization parameter indicating a quantization step used for each TU. The quantization section 15 outputs the quantized transform coefficient data (which will be referred to as quantized data below) to the lossless encoding section 16 and the inverse quantization section 21.

The lossless encoding section 16 encodes the quantized data input from the quantization section 15 for each CTU and thereby generates an encoded stream. In addition, the lossless encoding section 16 encodes various parameters to be referred to by a decoder and inserts the encoded parameters into a header area of the encoded stream. The parameters encoded by the lossless encoding section 16 can include block information indicating how to set a CTU, a CU, a TU, and a PU in an image, information of intra-prediction, and information of inter-prediction. The lossless encoding section 16 outputs the generated encoded stream to the accumulation buffer 17.

The accumulation buffer 17 temporarily accumulates the encoded stream input from the lossless encoding section 16 in a storage medium such as a semiconductor memory. Then, the accumulation buffer 17 outputs the accumulated encoded stream to a transmission section (not illustrated) (e.g., a communication interface or an interface to peripheral devices) at a rate in accordance with the band of a transmission path.

The rate control section 18 monitors the free space of the accumulation buffer 17. Then, the rate control section 18 generates a rate control signal in accordance with the free space on the accumulation buffer 17, and outputs the generated rate control signal to the quantization section 15. For example, when there is not much free space on the accumulation buffer 17, the rate control section 18 generates a rate control signal for lowering the bit rate of the quantized data. Also, for example, when the free space on the accumulation buffer 17 is sufficiently large, the rate control section 18 generates a rate control signal for increasing the bit rate of the quantized data.

The inverse quantization section 21, the inverse orthogonal transform section 22, and the addition section 23 constitute a local decoder. The local decoder takes a role of reconstructing an original image from encoded data.

In the quantization step used by the quantization section 15, the inverse quantization section 21 performs inverse quantization on the quantized data to thereby restore the transform coefficient data. Then, the inverse quantization section 21 outputs the restored transform coefficient data to the inverse orthogonal transform section 22.

The inverse orthogonal transform section 22 performs an inverse orthogonal transform process on the transform coefficient data input from the inverse quantization section 21 to thereby restore the prediction error data. Then, the inverse orthogonal transform section 22 outputs the restored prediction error data to the addition section 23.

The addition section 23 adds the restored prediction error data input from the inverse orthogonal transform section 22 to the predicted image data input from the intra-prediction section 30 or the inter-prediction section 40 to thereby generate decoded image data (reconstructed image). Then, the addition section 23 outputs the generated decoded image data to the deblocking filter 24 and the frame memory 26.

The deblocking filter 24 and the SAO filter 25 each are in-loop filters for improving image quality of a reconstructed image. The deblocking filter 24 removes a block distortion by filtering the decoded image data input from the addition section 23, and outputs the filtered decoded image data to the SAO filter 25. The SAO filter 25 removes noise by applying an edge offset process or a band offset process to the decoded image data input from the deblocking filter 24, and outputs the processed decoded image data to the frame memory 26.

The frame memory 26 stores the un-filtered decoded image data input from the addition section 23 and the decoded image data to which in-loop filtering has been applied input from the SAO filter 25 in a storage medium.

The switch 27 reads the un-filtered decoded image data to be used for the intra-prediction from the frame memory 26 and supplies the read decoded image data as reference image data to the intra-prediction section 30. Further, the switch 27 reads the filtered decoded image data to be used for the inter-prediction from the frame memory 26 and supplies the read decoded image data as reference image data to the inter-prediction section 40.

The mode setting section 28 sets a prediction mode for each CTU or CU on the basis of comparison of costs input from the intra-prediction section 30 and the inter-prediction section 40. The mode setting section 28 outputs predicted image data generated by the intra-prediction section 30 to the subtraction section 13 and information of intra-prediction to the lossless encoding section 16 for a block for which the intra-prediction mode has been set. In addition, the mode setting section 28 outputs predicted image data generated by the inter-prediction section 40 to the subtraction section 13 and outputs information of inter-prediction to the lossless encoding section 16 for a block for which an inter-prediction mode has been set.

The intra-prediction section 30 executes an intra-prediction process on one or more PUs set within each CTU on the basis of original image data and decoded image data. A PU can be divided into one or more TUs. For example, the intra-prediction section 30 evaluates a cost for each of prediction mode candidates included in a search range specified by HEVC on the basis of a prediction error and an amount of code to be generated. Then, the intra-prediction section 30 selects a prediction mode for which a cost is minimized, i.e., a prediction mode in which a compression rate is the highest, as an optimum prediction mode. In addition, the intra-prediction section 30 generates a predicted image data in accordance with the selected optimum prediction mode. Then, the intra-prediction section 30 outputs information of intra-prediction including prediction mode information indicating the optimum prediction mode, a corresponding cost, and the predicted image data to the mode setting section 28. In the present embodiment, the intra-prediction section 30 limits a search range of intra-prediction modes to a predetermined range in the case where a certain condition is satisfied. Accordingly, the dependent relationship between blocks can be moderated and a processing delay that may occur in the intra-prediction can be eliminated or shortened. A more detailed configuration of the intra-prediction section 30 will be described below.

The inter-prediction section 40 executes an inter-prediction process (motion detection and motion compensation) for one or more PUs set within each CTU on the basis of the original image data and the decoded image data. For example, the inter-prediction section 40 evaluates a cost for each of the prediction mode candidates included in a search range specified by HEVC on the basis of a prediction error and an amount of code to be generated. Then, the inter-prediction section 40 selects a prediction mode for which a cost is the minimum, i.e., a prediction mode in which a compression rate is the highest, as an optimum prediction mode. In addition, the inter-prediction section 40 generates predicted image data in accordance with the selected optimum prediction mode. Then, the inter-prediction section 40 outputs information of the inter-prediction, a corresponding cost, and the predicted image data to the mode setting section 28.

[2-2. Details of Intra-Prediction Section]

Figure 6:
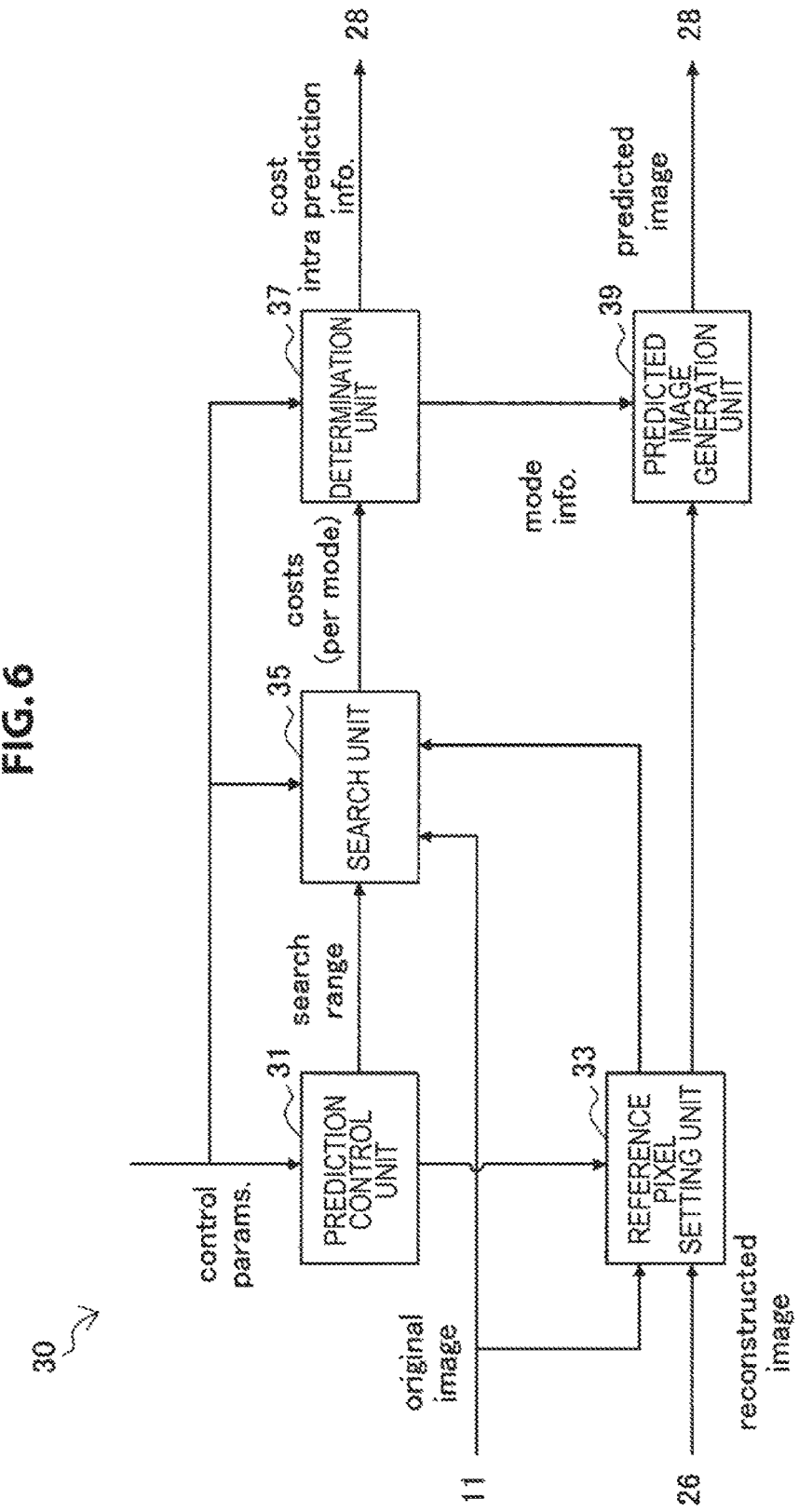
FIG. 6 is a block diagram illustrating an example of a detailed configuration of an intra-prediction section of the encoder illustrated in FIG. 5.

FIG. 6 is a block diagram illustrating an example of a detailed configuration of the intra-prediction section 30 of the encoder 10 illustrated in FIG. 5. Referring to FIG. 6, the intra-prediction section 30 has a prediction control unit 31, a reference pixel setting unit 33, a search unit 35, a determination unit 37, and a predicted image generation unit 39.

The prediction control unit 31 controls intra-prediction of the intra-prediction section 30 on the basis of a control parameter that is stored in a memory in advance, set by a user, or dynamically decided. For example, the prediction control unit 31 first causes the search unit 35 to search for a prediction mode of luma components for each prediction block and causes the determination unit 37 to determine an optimum prediction mode. In addition, the prediction control unit 31 causes the search unit 35 to search for a prediction mode of chrominance components and causes the determination unit 37 to determine an optimum prediction mode. Then, the prediction control unit 31 causes the predicted image generation unit 39 to generate predicted images in accordance with the determined optimum prediction modes. Intra-prediction is typically executed in an order from a block at a left side to a block at a right side and from a block at an upper side to a block at a lower side. However, the prediction control unit 31 can cause two or more blocks that are not in a dependent relationship to be processed in parallel with each other as far as a capability of the device permits (including the number of hardware circuits, the number of cores of a processor, the number of clocks, etc.). On the other hand, in the case where blocks have the dependent relationship and a second block refers to a pixel included in a first block, for example, the prediction control unit 31 causes the predicted image generation unit 39 to start processing of the second block after generation of a predicted image of the first block is completed.

A basic search range of the search unit 35 in which a prediction mode is searched for is defined using the specifications of HEVC. For example, angular prediction corresponding to about 33 predictive directions can be included in the search range for luma components in addition to planar prediction and DC prediction as illustrated in FIG. 1. A search range of intra-prediction modes are defined for chrominance components as shown in Table 1, and prediction modes with prediction mode numbers "0," "1," "10," "26," and "34," and a prediction mode (IntraPredModeY) selected for luma components can be included in the search range.

TABLE 1

Intra-Prediction Mode of Chrominance Components
(Table 8-2 in JCTVC - L1003_v34)

| intra_chroma_pred_mode [xCb][yCb] | IntraPredModeY [xCb][yCb] | | | | |
|---|---|---|---|---|---|
| | 0 | 26 | 10 | 1 | X (0 <= X <= 34) |
| 0 | 34 | 0 | 0 | 0 | 0 |
| 1 | 26 | 34 | 26 | 26 | 26 |
| 2 | 10 | 10 | 34 | 10 | 10 |
| 3 | 1 | 1 | 1 | 34 | 1 |
| 4 | 0 | 26 | 10 | 1 | X |

In the present embodiment, however, the prediction control unit 31 determines whether the chroma format is 4:2:2, and in the case where the chroma format is determined to be 4:2:2, the search range of the search unit 35 in an intra-prediction mode for a prediction block of chrominance components is limited to a predetermined range in which no upper reference pixels are referred to. The "upper reference pixels" mentioned here are assumed to include not only a reference pixel disposed immediately above a pixel of interest also a reference pixel disposed obliquely above a pixel of interest.

Figure 7:
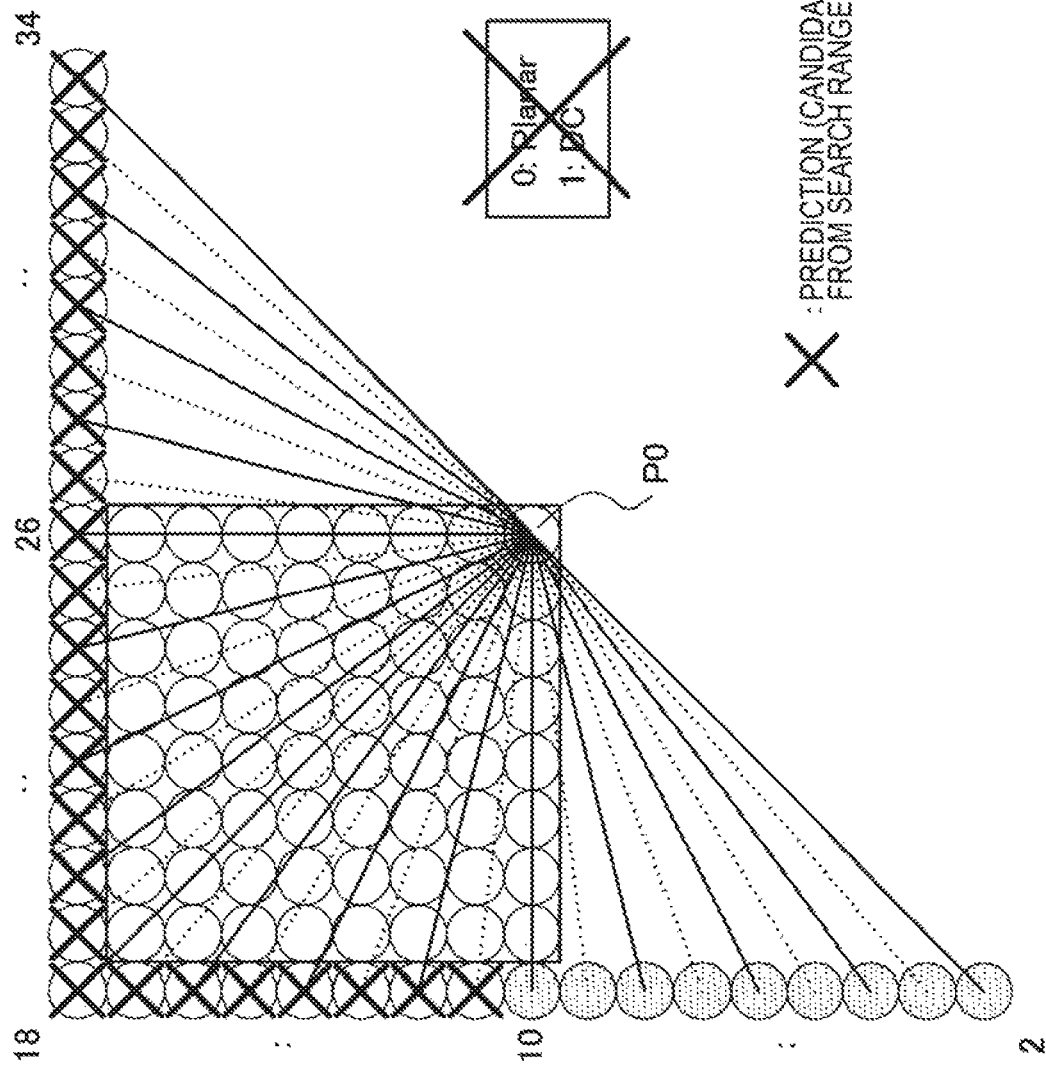
FIG. 7 is an illustrative diagram for describing limitation of a search range of an intra-prediction mode.

FIG. 7 is an illustrative diagram for describing limitation of a search range of intra-prediction modes. Referring to FIG. 7, prediction modes that can be excluded from the search range in the case where the chroma format is 4:2:2 are marked with X. Specifically, planar prediction, DC prediction, and angular prediction corresponding to the prediction mode numbers "11" to "34," in which reference pixels above the pixel of interest P0 should be referred to in order to generate a predicted image of the pixel of interest P0, are excluded from the search range of prediction modes of chrominance components. Thus, the search range of this case includes at least one or more of intra-prediction modes in which a reference pixel to the immediate left of the pixel of interest or a reference pixel positioned above the immediate left thereof is referred to (angular prediction corresponding to the prediction mode numbers "2" to "10"). The number of prediction modes (candidates) included in the search range is arbitrary, and for example, only a single prediction mode may be included in the search range. As a result of limitation of the search range, there is no possibility of a prediction mode in which the upper reference pixels should be referred to being selected, and thus, for example, the dependent relationship between the block $24_{Cb}(1)$ and block $24_{Cb}(2)$ shown in FIG. 3B is moderated. This means that generation of a predicted image of the block $24_{Cb}(2)$ can be started without waiting for an end of generation of a predicted image of the block $24_{Cb}(1)$.

Figure 8:
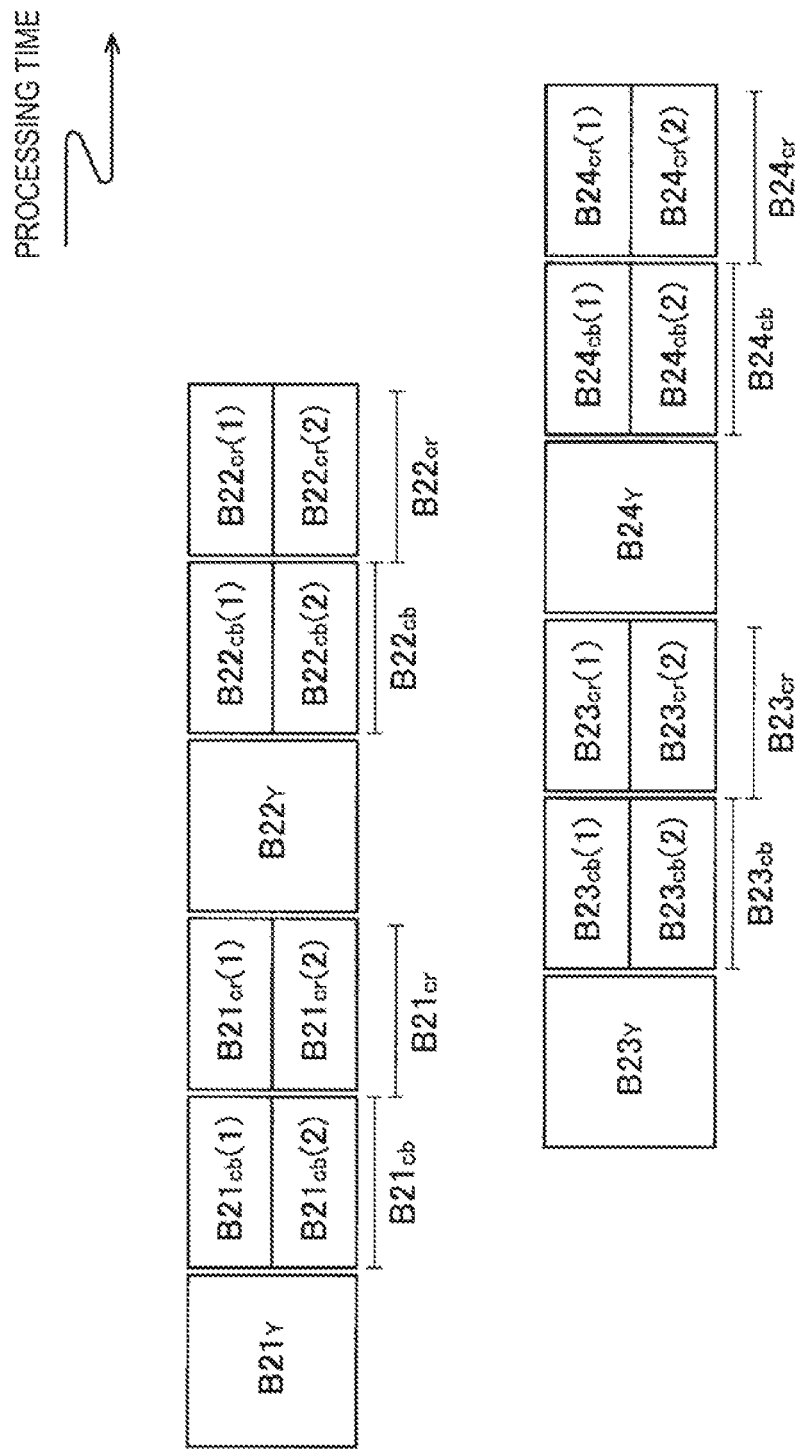
FIG. 8 is an illustrative diagram showing a case in which a delay in generation of a predicted image is eliminated due to limitation of a search range.

FIG. 8 is an illustrative diagram showing a case in which a delay in generation of a predicted image is eliminated due to limitation of the search range. Referring to FIG. 8, timings of a predicted image generation process for blocks illustrated in FIG. 2 are expressed on a time axis as in FIG. 4. As is understood from the difference of FIG. 8 from FIG. 4, for example, predicted images of the block $B21_{cb}(1)$ and $B21_{cb}(2)$ can be generated in parallel as a result of the dependent relationship between the block $B21_{cb}(1)$ and $B21_{cb}(2)$ being moderated. The same applies to other chrominance component blocks as well. That is, processing delays indicated by the curved arrows in FIG. 4 are eliminated and a time taken to generate a predicted image of chrominance components of each TU is shortened. According to analysis performed by the inventors, the number of necessary processing cycles per CU was reduced from 310 to 179 on average owing to the parallelized process. The highest number of necessary processing cycles after the parallelization was 224 in a case in which a TU size is 16×16. In addition, a required frequency of a processor under the conditions including a resolution of 4096×2160 (so-called 4k), a frame rate of 60 fps, a bit depth of 10 bits, and a chroma format of 4:2:2 was reduced from 698 MHz (before the parallelization) to 504 MHz (after the parallelization).

In the case where the encoder 10 supports both the H.264/AVC and HEVC schemes, the prediction control unit 31 determines which image coding scheme should be used. Then, in the case where an image is encoded using the HEVC scheme, the prediction control unit 31 effectuates the above-described limitation of the search range for chrominance components. On the other hand, in the case where the H.264/AVC scheme is used, the prediction control unit 31 does not effectuate the above-described limitation of the search range because the specifications of H.264/AVC do not include the dependent relationship between blocks as discussed in association with FIG. 3B (i.e., all candidate modes available in the specifications of H.264/AVC can be searched for).

Note that, although an example of the HEVC scheme has been mainly described in the present specification, the technology according to the present disclosure is not limited thereto. The technology according to the present disclosure can generally be applied to any image coding scheme which admits a dependent relationship between blocks as illustrated in FIG. 3B in association with the chroma format of 4:2:2.

The reference pixel setting unit 33 sets a reference pixel of each prediction block that is referred to in a search for an intra-prediction mode from original image data input from the sorting buffer 11 in the search range set by the prediction control unit 31. In the case where the reference pixel to be set is unavailable, the reference pixel setting unit 33 copies a pixel value from an available reference pixel and pads the reference pixel to be set therewith. The reference pixel setting unit 33 may use decoded image data in place of the original image data to search for an intra-prediction mode. In the case where decoded image data is used in searching for an intra-prediction mode, a processing delay caused by the dependent relationship between blocks may occur in the search process as well. However, such a processing delay that may occur in the search process can also be eliminated according to the technology of the present disclosure. Furthermore, the reference pixel setting unit 33 sets a reference pixel of each prediction block that will be referred to in generation of a predicted image from decoded image data input from the frame memory 26.

The search unit 35 searches the search range set by the prediction control unit 31 for an intra-prediction mode for each prediction block included in an image to be encoded. The search range for the luma components may be as described in the specifications of HEVC as described above. Thus, the search unit 35 evaluates each cost for, for example, planar prediction, DC prediction, and angular prediction corresponding to about 33 predictive directions on the basis of an error between the original image and a predicted image (i.e., a prediction error) and an amount of code that are assumed to be generated. On the other hand, in the case where the chroma format is 4:2:2, the search range for chrominance components can be limited to a predetermined range depending on various conditions described in the present specification. In the case where the search range is not limited, the search unit 35 evaluates a cost for each of prediction modes of chrominance components included in the search range according to the specifications of HEVC on the basis of an error between an original image and a predicted image and an amount of code that are assumed to be generated. In addition, in the case where the search range is limited, the search unit 35 evaluates a cost for each of prediction modes included in the search range that has been limited so that upper reference pixels are not referred to. Then, the search unit 35 outputs the value of the cost evaluated for each candidate mode included in the search range to the determination unit 37.

The determination unit 37 compares the values of the costs input from the search unit 35 for each prediction block with each other, and thereby determines an optimum (a lowest-cost) intra-prediction mode for luma components and an optimum intra-prediction mode for chrominance components. Then, the determination unit 37 outputs prediction mode information indicating the determined optimum modes to the predicted image generation unit 39. In addition, the determination unit 37 outputs information of intra-prediction including the prediction mode information and the costs of the optimum modes to the mode setting section 28.

The predicted image generation unit 39 generates predicted images of the luma components, first chrominance components, and second chrominance components of each prediction block in the optimum prediction modes determined by the determination unit 37 with reference to the reference pixel set by the reference pixel setting unit 33 from the decoded image data. In the case where every two blocks are in the dependent relationship, the predicted image generation unit 39 first generates a predicted image of one block and then generates a predicted image of the other block referring to pixels included in the first-generated predicted image. The predicted image generation unit 39 can generate predicted images of every two blocks that are not in the dependent relationship in a parallel manner. For example, in the case where the prediction control unit 31 limits the search range to a range in which no upper reference pixels are referred to, no dependent relationship is built between two vertically adjoining chrominance component blocks corresponding to one luma component block. In this case, the predicted image generation unit 39 can generate predicted images of the two vertically adjoining chrominance component blocks corresponding to one luma component block in the optimum intra-prediction modes determined based on the search result. Then, the predicted image generation unit 39 outputs the generated predicted images to the mode setting section 28.

Note that the description "being executed in a parallel manner" in the present specification means that a plurality of processes are executed in at least a partially or a temporally overlapping manner, rather than meaning that a plurality of processes are executed at the completely same time. Thus, even in the case where two processes are started at different timings, for example, if one process is started without waiting for an end of the other process, the two processes can be regarded as "being executed in a parallel manner."

[2-3. Additional Conditions]

(1) First Condition

Figure 9:
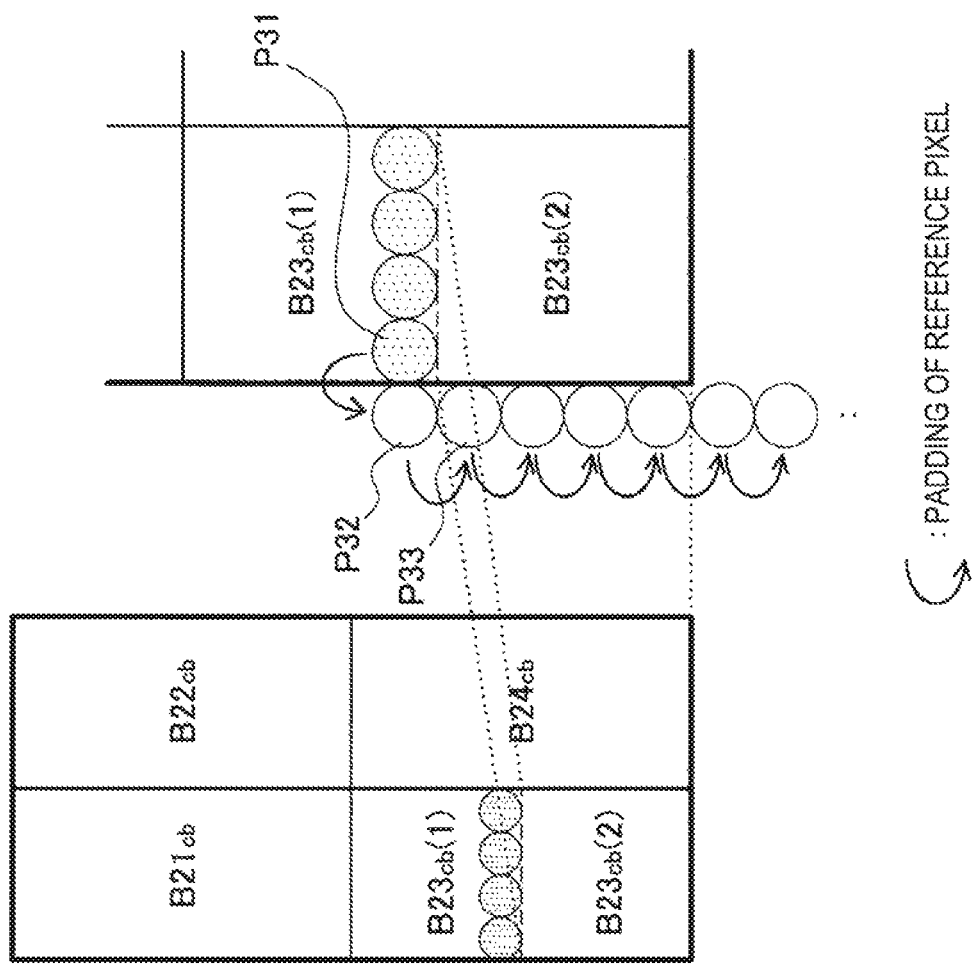
FIG. 9 is an illustrative diagram for describing an example of padding of reference pixels.

In the example of FIG. 7, a search range of a prediction mode for chrominance components is limited such that a reference pixel to the immediate left of the pixel of interest or a reference pixel positioned below the immediate left thereof is referred to. However, even if the search range is limited to the range described above, a dependent relationship between a block of interest and an upper block adjacent thereto still remains in a special case. This special case refers to a case in which the left side of the block of interest adjoins a boundary of a picture or a slice. In the case where the left side of the block of interest adjoins a boundary of a picture or a slice, pixels to the left of the block of interest are unavailable. In this case, according to the specifications of HEVC, left reference pixels are padded by copying a pixel value from an upper reference pixel as illustrated in FIG. 9. For example, a pixel value of an upper-left reference pixel P32 that is unavailable in the diagram is copied from an upper reference pixel P31 that is available, and further a pixel value of a left reference pixel P33 that is unavailable is copied from the reference pixel P32. In this case, the dependent relationship between blocks is not moderated even if the search range is limited to the above-described predetermined range, and thus the benefit of a reduced processing delay may not be gained. Thus, in the case where the left side of a block adjoins a boundary of a picture or a slice, the prediction control unit 31 may not limit the search range of the block to the above-described range even if the chroma format is 4:2:2.

Figure 10A:
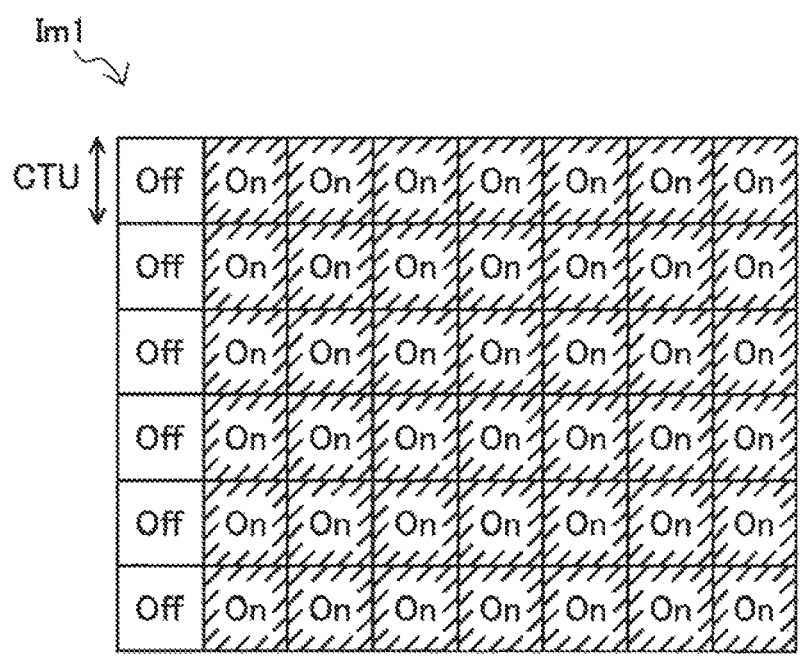
FIG. 10A is an illustrative diagram for describing an example of control of limitation of a search range on the basis of availability of reference pixels.
Figure 10B:
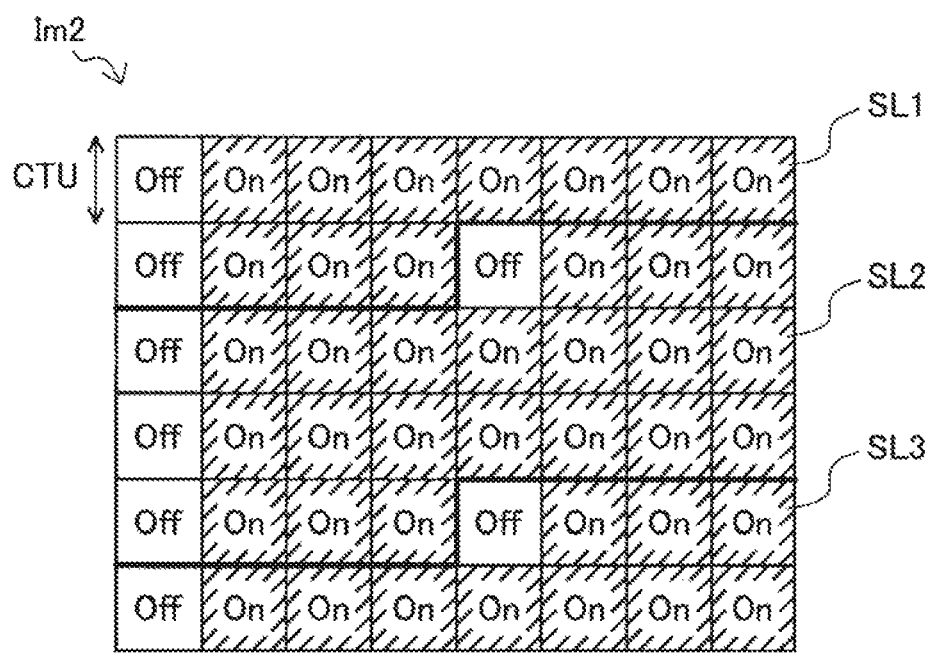
FIG. 10B is an illustrative diagram for describing another example of control of limitation of a search range on the basis of availability of reference pixels.

FIGS. 10A and 10B illustrate examples of control of limitation of a search range on the basis of availability (available or unavailable) of reference pixels. An image Im1 shown in FIG. 10A has 8 CTUs in the horizontal direction and 6 CTUs in the vertical direction. The same applies to an image Im2 shown in FIG. 10B. However, the image Im2 is divided into three slices SL1, SL2, and SL3. The limitation of a search range is effectuated for CTUs that are labeled as "on" among these CTUs in the diagram. On the other hand, the limitation of the search range is nullified for CTUs that are labeled as "off." In the example of FIG. 10A, the limitation of the search range is nullified for 6 CTUs that are positioned at the left end of the image Im1. All types of prediction mode may be included in the search range for these CTUs even if the chroma format is 4:2:2. In the example of FIG. 10B, the limitation of the search range is nullified for the head CTUs of the slices SL2 and SL3 included in the image Im2 in addition to the 6 CTUs positioned at the left end of the image Im1. All types of prediction mode may be included in the search range for these CTUs as well even if the chroma format is 4:2:2. By nullifying the limitation of the search range for the block containing unavailable reference pixels to its left, it is possible to avoid the disadvantageous limitation (that does not deliver the benefit of a reduction in a processing delay). Note that, although the example in which the limitation of the search range is controlled in units of CTUs has been introduced here, the embodiment is not limited thereto, and the limitation of the search range may be controlled in different units of, for example, CUs or PUs. In addition, the limitation of the search range may be nullified not only for a block of which the left side adjoins a boundary of a picture or a slice but also for a block of which the left side adjoins a boundary of a tile.

(2) Second Condition

An image can be seriously distorted due to a prediction error in the case where a search range of prediction modes for chrominance components is limited as described above. In particular, if the search range is limited such that only a reference pixel to the immediate left of a pixel of interest or a reference pixel positioned below the immediate left thereof is referred to, there is a high likelihood of a distortion of an image having a high correlation in the horizontal direction. In the case where such a distortion appears over many blocks arranged in the horizontal direction, the distortion can be subjectively sensed by an end user as stripe shapes with deteriorated image quality in the horizontal direction. Thus, as one technique for avoiding such deterioration in image quality, the prediction control unit 31 can limit a search range of prediction modes for chrominance components to a predetermined range only for a subset of CTUs selected among CTUs constituting an image in accordance with a certain rule. The certain rule may be, for example, interspersing CTUs for which the search range should be limited within an image.

Figure 11A:
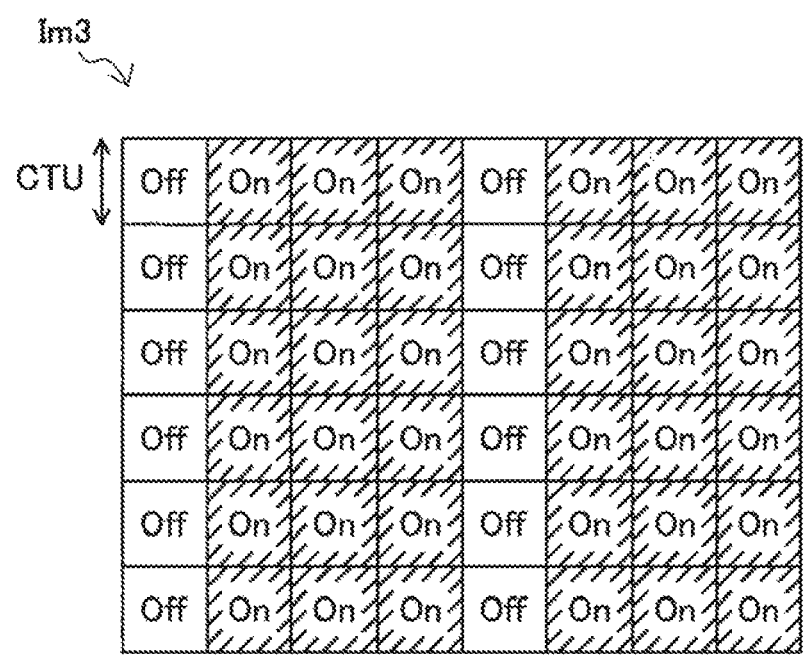
FIG. 11A is an illustrative diagram for describing an example of control of limitation of a search range on the basis of block positions.
Figure 11B:
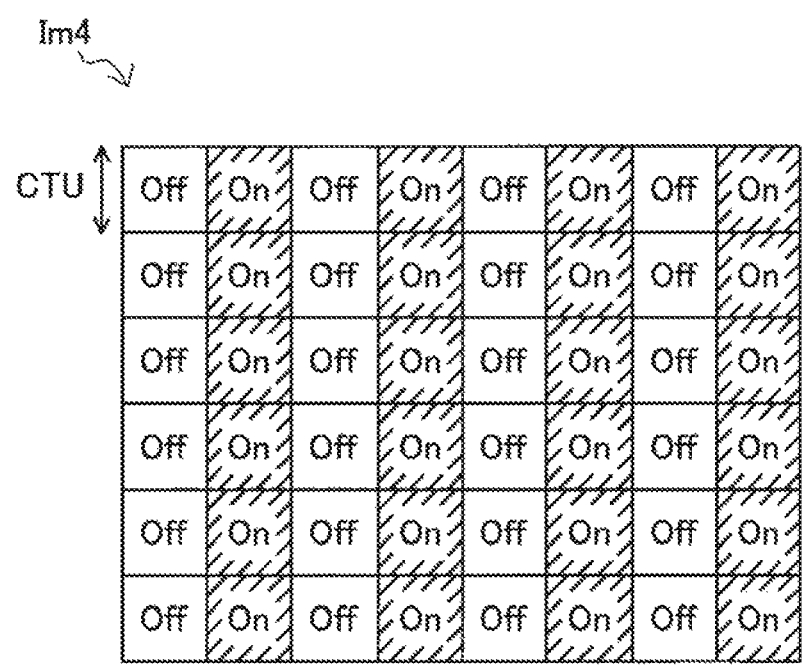
FIG. 11B is an illustrative diagram for describing another example of control of limitation of a search range on the basis of block positions.

FIGS. 11A and 11B illustrate examples of control of limitation of a search range on the basis of block positions. An image Im3 shown in FIG. 11A and an image Im4 shown in FIG. 11B each have 8 CTUs in the horizontal direction and 6 CTUs in the vertical direction. In the example of FIG. 11A, limitation of the search range is nullified for one leading CTU of every 4 CTUs that are consecutive in the horizontal direction. In the example of FIG. 11B, limitation of the search range is nullified for one of every two CTUs that are consecutive in the horizontal direction. All types of prediction modes may be included in the search range for these CTUs even if the chroma format is 4:2:2. By interspersing CTUs for which the search range should be limited within an image (e.g., by providing blocks for which the search range is not limited at uniform intervals in the horizontal direction), propagation of distortion of the image caused by a prediction error resulting from the limitation of the search range can be prevented and deterioration of image quality that is subjectively sensed can be reduced. A control parameter which enables a user to set a rule of limiting the search range (e.g., an interval or a proportion of CTUs to which no limitation is applied) may be provided.

(3) Third Condition

The stripe-shaped deterioration of subjective image quality in the horizontal direction described in the above section can be conspicuous in the case where a block size is large. In the case where a block size is small, distortion is discontinuous at block boundaries, which gives a weakened influence to subjective image quality. Thus, in the case where a TU size corresponding to a block of interest exceeds a pre-decided threshold value, the prediction control unit 31 may not limit a search range of the block of interest as another technique for avoiding deterioration of image quality. The threshold value of the TU size mentioned there is, for example, one of 4×4, 8×8, or 16×16. A control parameter which enables a user to set the threshold value may be provided. As a block size becomes greater, a ratio of a processing delay (caused by the dependent relationship between blocks) to a processing time of a predicted image generation process becomes lower, and thus limiting the search range as long as a block size does not exceed the above-mentioned threshold value is advantageous in light of a tradeoff between performance and image quality.

(4) Fourth Condition

The prediction control unit 31 may further control whether or not a search range of intra-prediction modes for chrominance components is to be limited to a predetermined range on the basis of at least one of resolution and a frame rate of an image. If devices have identical performance, a performance requirement for coding and decoding is stricter when a resolution is higher or a frame rate is higher. Thus, in the case where either of or both a resolution and a frame rate is/are high, a desired performance requirement can be met by shortening a processing delay while sacrificing image quality to some degree in accordance with the above-described mechanism.

FIG. 12 is a table for describing an example of control of limitation of a search range on the basis of resolutions and frame rates of an image. Referring to FIG. 12, control data D1 in a table format is shown as an example. The control data D1 defines whether or not limitation of a search range is to be effectuated for each combination of a resolution, a frame rate, and a ratio of the chroma format. For example, in the case where the resolution is 4096×2160, the frame rate is 60 fps, and the chroma format is 4:2:2, the limitation of the search range is effectuated ("on") and a processing delay is reduced. In the case where the resolution is 4096×2160, the frame rate is 30 fps, and the chroma format is 4:2:2, the limitation of the search range is effectuated and a processing delay is reduced as well. In the case where the resolution is 2048×1088, the frame rate is 60 fps, and the chroma format is 4:2:2, the limitation of the search range is effectuated and a processing delay is reduced as well. In the case where the resolution is 1920×1088, the frame rate is 60 fps, and the chroma format is 4:2:2, the limitation of the search range is nullified ("off"). In the case where the resolution is 2048×1088, the frame rate is 30 fps, and the chroma format is 4:2:2, the limitation of the search range is nullified as well. This control data D1 is stored in, for example, a memory in advance and is referred to when the prediction control unit 31 determines whether or not the limitation of the search range is to be effectuated. Instead of the control data D1, threshold values that are compared with a resolution and a frame rate may be defined.

Several conditions for controlling a search range of intra-prediction modes for chrominance components have been described in this section. The conditions described here may be combined with each other in any form, and another condition may be further added thereto.

[2-4. Encoding of Control Information]

A stream encoded by the encoder 10 in accordance with the mechanism described in this chapter can be decoded by a standard decoder that operates in accordance with the specifications of HEVC. A standard decoder generates a predicted image of intra-prediction blocks in a prediction mode designated merely by an encoding parameter, without recognizing whether or not a search range in which an intra-prediction mode is searched for is limited. However, having a decoder that has recognized that the search range for the intra-prediction mode was limited to a range in which no upper reference pixels are referred to at the time of encoding is also advantageous. The reason for this is that, if the decoder can recognize the limitation of the search range, the decoder can also generate predicted images for two vertically adjoining chrominance component blocks corresponding to one luma component block as illustrated in FIG. 3B in a parallel manner.

Thus, the prediction control unit 31 of the intra-prediction section 30 may generate limitation information indicating that a search range has been limited in the case where the search range for searching for an intra-prediction mode is limited to the above-described predetermined range in association with the chroma format of 4:2:2 as a modified example. The limitation information mentioned here may include one flag defined for an arbitrary level, for example, a sequence, a picture, a slice, a CTU, a CU, a PU, or a TU. In addition, the limitation information may further include information of an interval of CTUs for which limitation of a search range is effectuated or nullified, a threshold value to be compared to a TU size, or the like. The limitation information generated by the prediction control unit 31 is encoded by the lossless encoding section 16 and can be inserted into, for example, an extended information domain of an encoded stream.

<3. Flow of Process During Encoding>

[3-1. Intra-Prediction Process]

Figure 13:
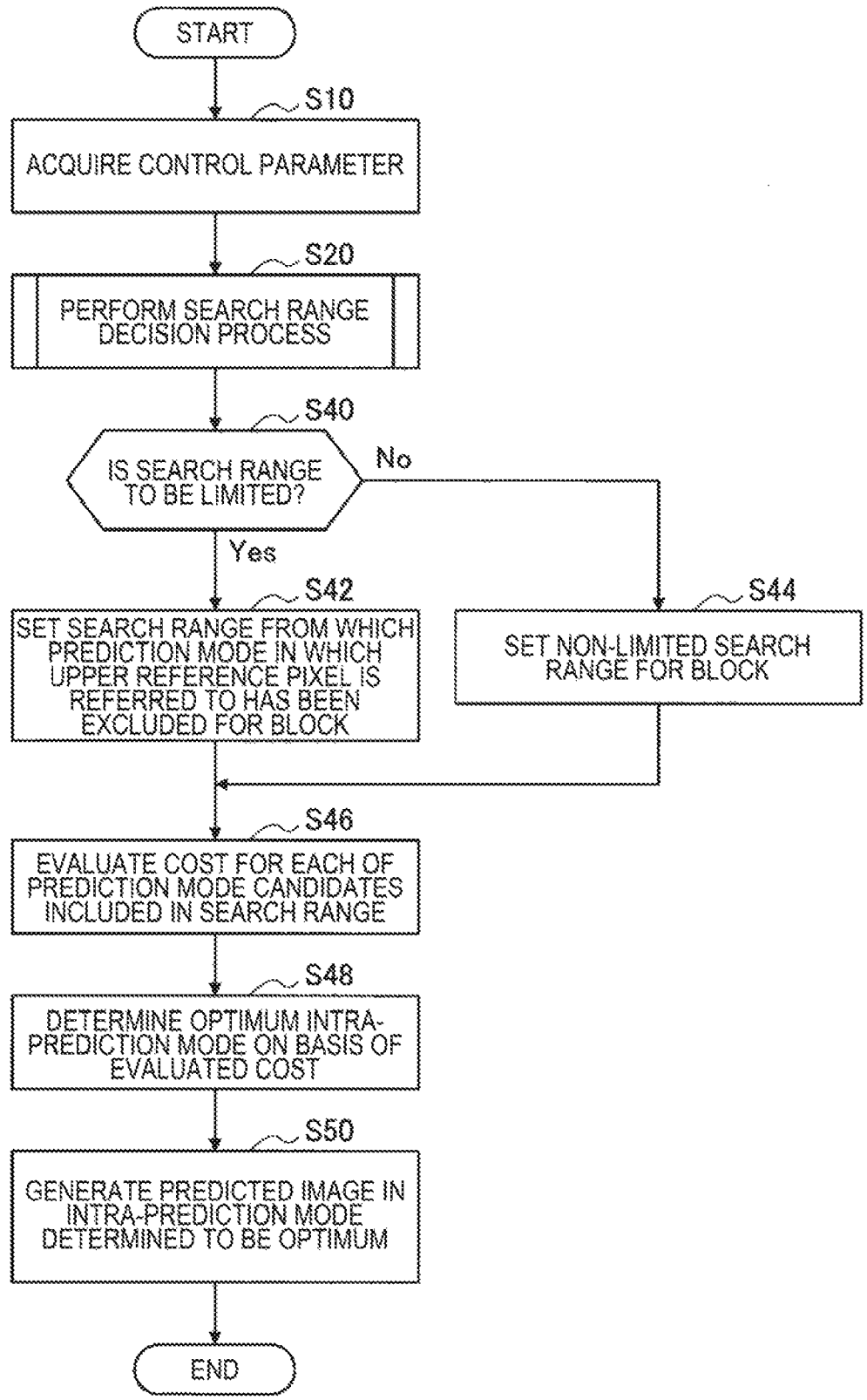
FIG. 13 is a flowchart showing an example of a flow of an intra-prediction process at the time of encoding according to an embodiment.

FIG. 13 is a flowchart showing an example of a flow of an intra-prediction process during encoding according to an embodiment.

Referring to FIG. 13, the prediction control unit 31 first acquires a control parameter to be used for controlling intra-prediction (Step S10). The control parameter acquired here includes, for example, one or more of identification information of an encoding scheme, a chroma format, a block size, a block position, a resolution, a frame rate, and threshold value information. Then, the prediction control unit 31 executes a search range decision process using the acquired control parameter (Step S20). Several examples of the search range decision process executed here will be described later in more detail.

Next, the prediction control unit 31 determines whether or not the decision to limit a search range of intra-prediction modes to a predetermined range has been made in the search range decision process (Step S40). The predetermined range mentioned here is a range in which only a prediction mode in which no upper reference pixels are referred to is included. In the case where it has been decided to limit the search range, the prediction control unit 31 sets a search range from which the prediction mode in which upper reference pixels are referred to has been excluded for a block of interest (Step S42). On the other hand, in the case where it has been decided not to limit the search range, the prediction control unit 31 sets a normal search range (typically, a range in which all candidate modes permitted by the specifications of HEVC) as a block of interest (Step S44). Note that, in intra-prediction of luma components, no search range can be limited and the process can skip Step S44.

Next, the search unit 35 evaluates a cost for each of prediction mode candidates included in the search range set by the prediction control unit 31 on the basis of a prediction error and an amount of code to be generated using a reference pixel set by the reference pixel setting unit 33 (Step S46). Next, the determination unit 37 compares the costs evaluated by the search unit 35 with each other, thereby determining an optimum intra-prediction mode for luma components or chrominance components (Step S48). Then, the predicted image generation unit 39 generates a predicted image of the luma components or a predicted image of first chrominance components and second chrominance components in the optimum prediction mode determined by the determination unit 37 using the reference pixel set by the reference pixel setting unit 33 (Step S50).

The intra-prediction process shown in FIG. 13 is executed for each of the luma components and the chrominance components in units of blocks. An intra-prediction process may be executed for at least some of a plurality of blocks having no dependent relationship in a parallel manner. Process steps that are not dependent on a parameter unique to a block may be executed once across a plurality of blocks, rather than being executed in units of blocks, regardless of the illustrated example.

[3-2. Search Range Decision Process]

(1) First Example

Figure 14A:
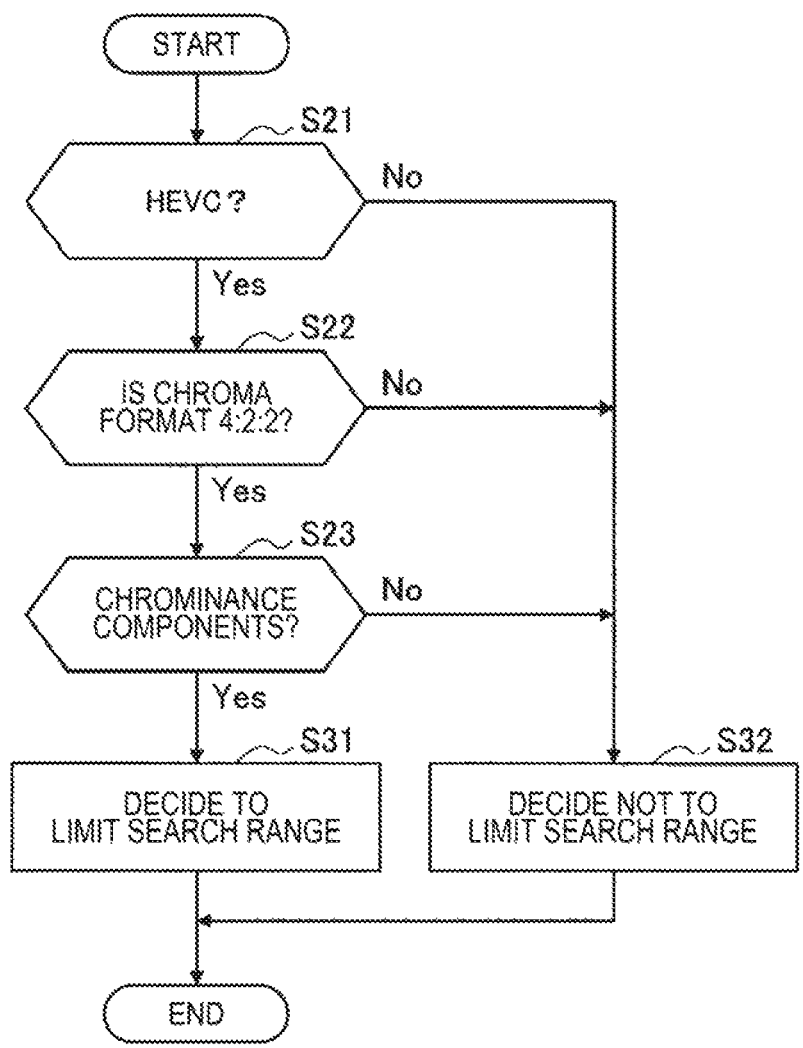
FIG. 14A is a flowchart showing a first example of a detailed flow of the search range decision process of the flowchart shown in FIG. 13.

FIG. 14A is a flowchart showing a first example of a detailed flow of the search range decision process of the flowchart shown in FIG. 13. Referring to FIG. 14A, the prediction control unit 31 first determines whether or not the HEVC scheme is to be used for image encoding (Step S21). In the case where the HEVC scheme is to be used, the prediction control unit 31 determines whether or not the chroma format is 4:2:2 (Step S22). In the case where the chroma format is 4:2:2, the prediction control unit 31 determines whether or not color components to be processed are chrominance components (Step S23). In the case where color components to be processed are chrominance components, the prediction control unit 31 decides to limit the search range of intra-prediction modes to a range in which only a prediction mode in which no upper reference pixels are referred to is included (Step S31). On the other hand, in the case where the HEVC scheme is not used (for example, H.264/AVC is used), the chroma format is not 4:2:2, or color components to be processed are luma components, the prediction control unit 31 decides not to limit the search range of intra-prediction modes (Step S32).

(2) Second Example

Figure 14B:
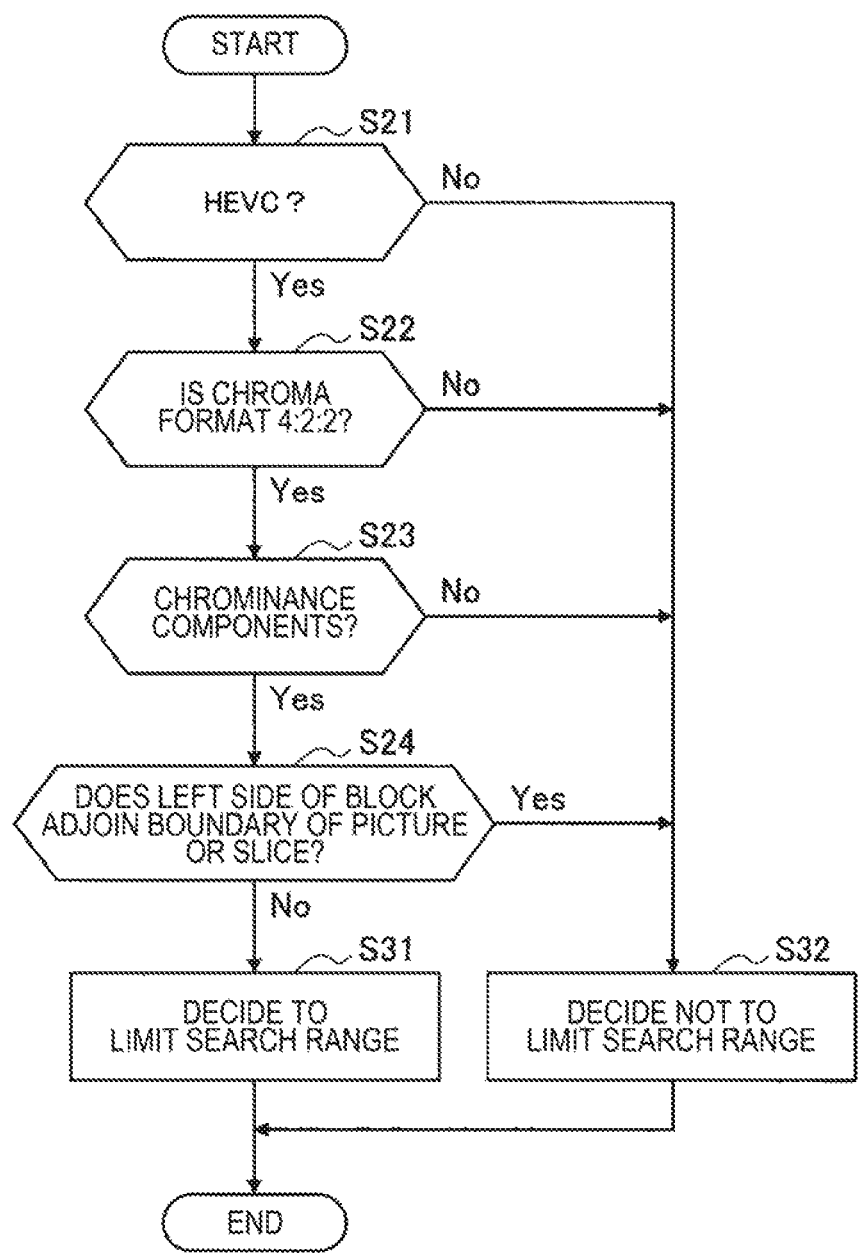
FIG. 14B is a flowchart showing a second example of a detailed flow of the search range decision process of the flowchart shown in FIG. 13.

FIG. 14B is a flowchart showing a second example of a detailed flow of the search range decision process of the flowchart shown in FIG. 13. Referring to FIG. 14B, the prediction control unit 31 first determines whether or not the HEVC scheme is to be used for image encoding (Step S21). In the case where the HEVC scheme is to be used, the prediction control unit 31 determines whether or not the chroma format is 4:2:2 (Step S22). In the case where the chroma format is 4:2:2, the prediction control unit 31 determines whether or not color components to be processed are chrominance components (Step S23). In the case where color components to be processed are chrominance components, the prediction control unit 31 determines whether or not the left side of a block of interest (a block to be processed) adjoins a boundary of a picture or a slice (Step S24). In the case where the left side of the block of interest does not adjoin a boundary of a picture or a slice, the prediction control unit 31 decides to limit the search range of intra-prediction modes to a range in which only a prediction mode in which no upper reference pixels are referred to is included (Step S31). On the other hand, in the case where the HEVC scheme is not used, the chroma format is not 4:2:2, color components to be processed are luma components, or the left side of the block of interest adjoins a boundary of a picture or a slice, the prediction control unit 31 decides not to limit the search range of intra-prediction modes (Step S32).

(3) Third Example

FIG. 14C is a flowchart showing a third example of a detailed flow of the search range decision process of the flowchart shown in FIG. 13. Referring to FIG. 14C, after the determination of a use of the HEVC scheme (Step S21), the chroma format (Step S22), and color components to be processed (Step S23), the prediction control unit 31 further determines whether or not limitation of a search range has been effectuated for a current CTU (i.e., a CTU to which a block of interest belongs) (Step S25). For example, in the case where limitation of a search range has been effectuated for the current CTU such as a CTU labeled as "on" in FIG. 11A or FIG. 11B, the prediction control unit 31 decides to limit the search range of intra-prediction modes to a range in which only a prediction mode in which no upper reference pixels are referred to is included (Step S31). On the other hand, in the case where the HEVC scheme is not used, the chroma format is not 4:2:2, color components to be processed are luma components, or the limitation of the search range for the current CTU has not been effectuated, the prediction control unit 31 decides not to limit the search range of intra-prediction modes (Step S32).

(4) Fourth Example

FIG. 14D is a flowchart showing a fourth example of a detailed flow of the search range decision process of the flowchart shown in FIG. 13. Referring to FIG. 14D, after the determination of a use of the HEVC scheme (Step S21), the chroma format (Step S22), and color components to be processed (Step S23), the prediction control unit 31 further determines whether or not a TU size corresponding to a block of interest exceeds a threshold value (Step S26). In the case where the TU size does not exceed the threshold value, the prediction control unit 31 decides to limit the search range of intra-prediction modes to a range in which only a prediction mode in which no upper reference pixels are referred to is included (Step S31). On the other hand, in the case where the HEVC scheme is not used, the chroma format is not 4:2:2, color components to be processed are luma components, or the TU size exceeds the threshold value, the prediction control unit 31 decides not to limit the search range of intra-prediction modes (Step S32).

(5) Fifth Example

FIG. 14E is a flowchart showing a fifth example of a detailed flow of the search range decision process of the flowchart shown in FIG. 13. Referring to FIG. 14E, after the determination of a use of the HEVC scheme (Step S21), the chroma format (Step S22), and color components to be processed (Step S23), the prediction control unit 31 further determines whether or not a resolution and a frame rate of an image satisfy a condition for effectuating limitation of a search range (Step S27). For example, in the case where a combination of a resolution and a frame rate is associated with effectuation of the limitation of the search range in control data as shown in FIG. 12, the prediction control unit 31 decides to limit the search range of intra-prediction modes to a range in which only a prediction mode in which no upper reference pixels are referred to is included (Step S31). On the other hand, in the case where the HEVC scheme is not used, the chroma format is not 4:2:2, color components to be processed are luma components, or the resolution and the frame rate do not satisfy the condition for effectuating the limitation of the search range, the prediction control unit 31 decides not to limit the search range of intra-prediction modes (Step S32).

The conditions to be determined in the search range decision process shown in FIGS. 14A to 14E may be combined with each other in any form. In addition, an order in which the conditions are determined is not limited to the illustrated example. The described process may be divided into a plurality of processes so that determination of some conditions is made once across a plurality of blocks and determination of remaining conditions is repeated in units of blocks.

<4. Example of Configuration of Decoder>

A stream encoded using the technology of the present disclosure can be decoded by a standard decoder that operates in accordance with the specifications of HEVC as described above. However, if a decoder has an extended function of recognizing that a search range of intra-prediction modes is limited to a range in which no upper reference pixels are referred to during encoding, the decoder can shorten a processing delay in an intra-prediction process and improve decoding performance. In this section, an example of a configuration of such an extended decoder will be described.

[4-1. Overall Configuration]

Figure 15:
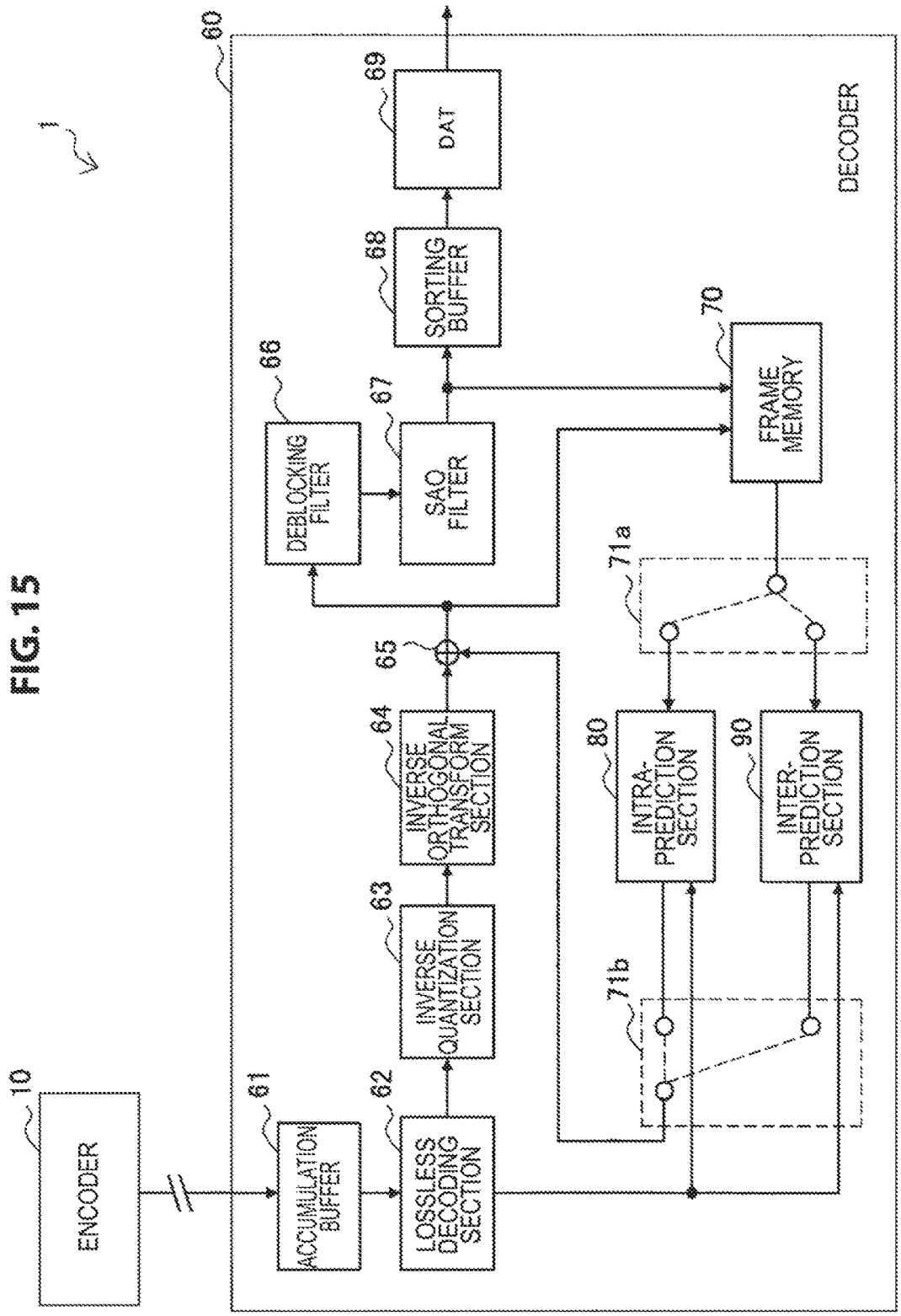
FIG. 15 is a block diagram illustrating an example of a schematic configuration of a system that includes an encoder and a decoder.

FIG. 15 illustrates an example of a schematic configuration of an image processing system 1. The image processing system 1 includes the encoder 10 and a decoder 60. The encoder 10 limits a search range in which an intra-prediction mode is searched for to a predetermined range in which no upper reference pixels are referred to, in relation to the fact that the chroma format is 4:2:2 in intra-prediction when a series of images included in a video is encoded. Then, the encoder 10 inserts limitation information indicating that the search range of intra-prediction modes has been limited as above into an encoded stream. The decoder 60 receives the encoded stream from the encoder 10, and decodes the series of images while executing the intra-prediction process on the basis of the limitation information extracted from the encoded stream in a parallel manner.

More specifically, the decoder 60 includes an accumulation buffer 61, a lossless decoding section 62, an inverse quantization section 63, an inverse orthogonal transform section 64, an addition section 65, a deblocking filter 66, an SAO filter 67, a sorting buffer 68, a digital-to-analogue (D/A) converting section 69, a frame memory 70, a selector 71a and 71b, an intra-prediction section 80, and an inter-prediction section 90.

The accumulation buffer 61 temporarily accumulates the encoded stream using a storage medium.

The lossless decoding section 62 decodes quantized data from the encoded stream input from the accumulation buffer 61 in accordance with the encoding stream used during encoding. In addition, the lossless decoding section 62 decodes information inserted into a header region of the encoded stream. The information decoded by the lossless decoding section 62 can include, for example, block information, limitation information, information regarding intra-prediction, and information regarding inter-prediction. The lossless decoding section 62 outputs the quantized data to the inverse quantization section 63. In addition, the lossless decoding section 62 outputs the limitation information and information regarding intra-prediction to the intra-prediction section 80. Furthermore, the lossless decoding section 62 outputs the information regarding inter-prediction to the inter-prediction section 90.

The inverse quantization section 63 inversely quantizes the quantized data input from the lossless decoding section 62 in the same quantization step used in encoding to restore transform coefficient data. The inverse quantization section 63 outputs the restored transform coefficient data to the inverse orthogonal transform section 64.

The inverse orthogonal transform section 64 performs an inverse orthogonal transform on the transform coefficient data input from the inverse quantization section 63 in accordance with an orthogonal transform scheme used in the encoding, thereby generating prediction error data. The inverse orthogonal transform section 64 outputs the generated prediction error data to the addition section 65.

The addition section 65 generates decoded image data by adding the prediction error data input from the inverse orthogonal transform section 64 to predicted image data input from the selector 71b. Then, the addition section 65 outputs the generated decoded image data to the deblocking filter 66 and the frame memory 70.

The deblocking filter 66 removes a block distortion by filtering the decoded image data input from the addition section 65 and outputs the filtered decoded image data to the SAO filter 67.

The SAO filter 67 removes noise by applying an edge offset process or a band offset process to the decoded image data input from the deblocking filter 66 and outputs the processed decoded image data to the sorting buffer 68 and the frame memory 70.

The sorting buffer 68 sorts the image input from the SAO filter 67, thereby generating a series of time-series image data. Then, the sorting buffer 68 outputs the generated image data to the D/A conversion section 69.

The D/A conversion section 69 converts the image data in a digital form input from the sorting buffer 68 to an image signal in an analog form. Then, the D/A conversion section 69 outputs the analog image signal to, for example, a display (not illustrated) connected to the decoder 60, thereby displaying the decoded video.

The frame memory 70 stores the unfiltered decoded image data input from the addition section 65 and the filtered decoded image data input from the SAO filter 67 in a storage medium.

The selector 71a switches an output destination of the image data from the frame memory 70 between the intra-prediction section 80 and the inter-prediction section 90 for each block included in the image in accordance with mode information acquired by the lossless decoding section 62. In the case where an intra-prediction mode has been designated, for example, the selector 71a outputs the decoded image data that has not been filtered supplied from the frame memory 70 to the intra-prediction section 80 as reference image data. In addition, in the case where an inter-prediction mode has been designated, the selector 71a outputs the filtered decoded image data to the inter-prediction section 90 as reference image data.

The selector 71b switches an output source of the predicted image data to be supplied to the addition section 65 between the intra-prediction section 80 and the inter-prediction section 90 in accordance with mode information acquired by the lossless decoding section 62. In the case where the intra-prediction mode has been designated, for example, the selector 71b supplies the predicted image data output from the intra-prediction section 80 to the addition section 65. In addition, in the case where the inter-prediction mode has been designated, the selector 71b supplies the predicted image data output from the inter-prediction section 90 to the addition section 65.

The intra-prediction section 80 performs an intra-prediction process on the basis of information regarding intra-prediction input from the lossless decoding section 62 and the reference image data from the frame memory 70, thereby generating the predicted image data. In the present embodiment, the intra-prediction section 30 determines whether or not the search range of intra-prediction modes has been limited to a predetermined range in the encoder, on the basis of control information input from the lossless decoding section 62. In the case where the search range has been limited, the intra-prediction section 30 executes the predicted image generation process across the plurality of blocks in a parallel manner since the dependent relationship between the blocks has been moderated. Accordingly, it is possible to eliminate or shorten a processing delay in intra-prediction. Then, the intra-prediction section 80 outputs the generated predicted image data to the selector 71b. This configuration of the intra-prediction section 80 will be further described below in detail.

The inter-prediction section 90 performs an inter-prediction process on the basis of information regarding inter-prediction input from the lossless decoding section 62 and the reference image data from the frame memory 70, thereby generating the predicted image data. Then, the inter-prediction section 90 outputs the generated predicted image data to the selector 71b.

[4-2. Details of Intra-Prediction Section]

Figure 16:
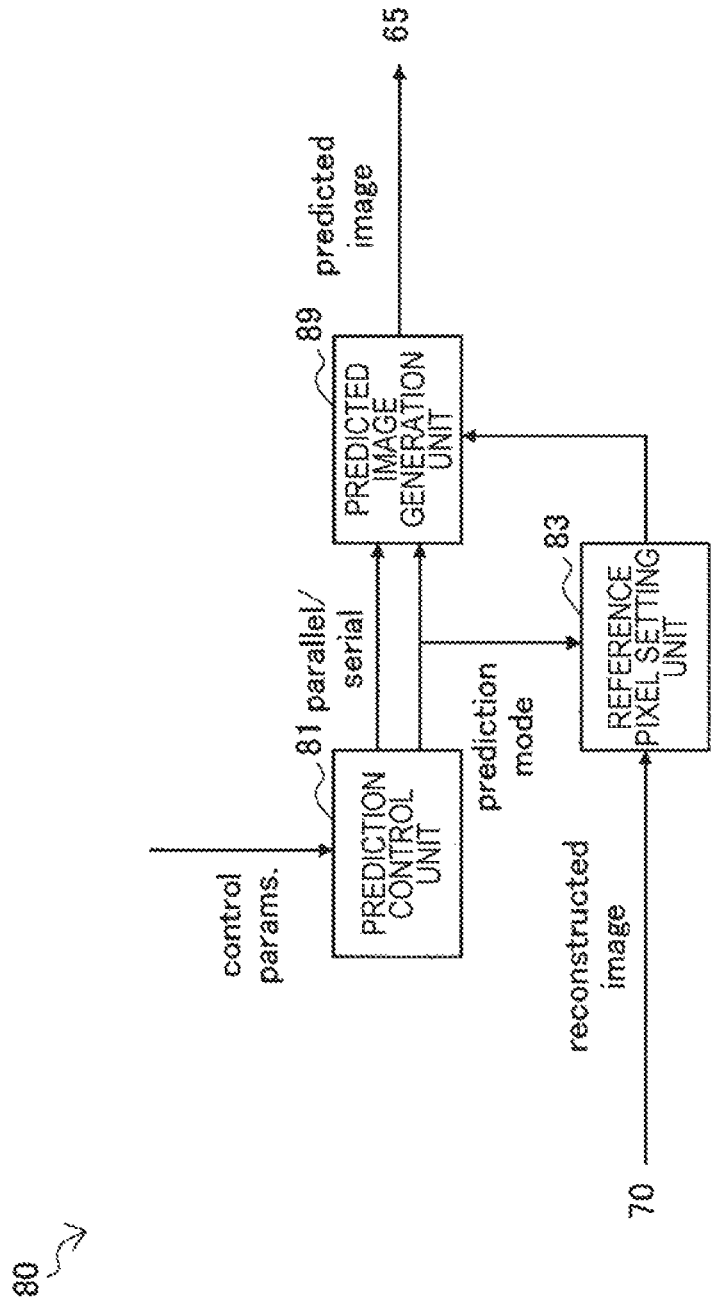
FIG. 16 is a block diagram illustrating a detailed configuration of an intra-prediction section of the decoder shown in FIG. 15.

FIG. 16 is a block diagram illustrating a detailed configuration of the intra-prediction section 80 of the decoder 60 shown in FIG. 15. Referring to FIG. 16, the intra-prediction section 80 has a prediction control unit 81, a reference pixel setting unit 83, and a predicted image generation unit 89.

The prediction control unit 81 controls intra-prediction performed in the intra-prediction section 80 on the basis of a control parameter included in the information regarding intra-prediction and the above-described control information. For example, the prediction control unit 81 causes the predicted image generation unit 89 to generate a predicted image of luma components with respect to each prediction block in accordance with a prediction mode of the luma components indicated by prediction mode information. In addition, the prediction control unit 81 causes the predicted image generation unit 89 to generate a predicted image of first chrominance components and second chrominance components in accordance with a prediction mode of the chrominance components indicated by the prediction mode information.

Intra-prediction is typically executed in an order from a left block to right block and an upper block to a lower block. However, the prediction control unit 81 can cause the process to be executed on two or more blocks having no dependent relationship in a parallel manner as far as a capability of the device permits. For example, the prediction control unit 81 determines whether a search range of intra-prediction modes for chrominance components has been limited to a range in which no upper reference pixels are referred to in relation to the fact that the chroma format was 4:2:2 in intra-prediction during encoding of an image, with reference to the above-described control information. The control information may be, as an example, a set of flags indicating whether or not the search range has been limited for each block or for a plurality of blocks together. In addition, the prediction control unit 81 may determine for each CTU whether or not the search range has been limited in the CTU complying with a rule indicated by the control information. Furthermore, the prediction control unit 81 may determine for each TU whether or not the search range has been limited by comparing a threshold value indicated by the control information with a TU size. The prediction control unit 81 causes the predicted image generation unit 89 to generate predicted images of a chrominance component block for which the search range has been limited to a range in which no upper reference pixels are referred to and an above-adjoining chrominance component block in a parallel manner.

The reference pixel setting unit 83 sets a reference pixel to be referred to in generation of a predicted image of each prediction block from decoded image data input from the frame memory 70 under control of the prediction control unit 81. In the case where a reference pixel to be set is unavailable, the reference pixel setting unit 83 pads the reference pixel to be set by copying a pixel value from an available reference pixel.

The predicted image generation unit 89 generates predicted images of the luma components, first chrominance components, and second chrominance components of each prediction block in accordance with a prediction mode designated by the prediction control unit 81 while referring to the reference pixel set by the reference pixel setting unit 83 from the decoded image data. In the case where every two blocks have a dependent relationship, the predicted image generation unit 89 generates a predicted image of one block first and further generates a predicted image of the other block with reference to pixels included in the first generated predicted image. The predicted image generation unit 89 can generate predicted images of two or more blocks not having a dependent relationship in a parallel manner. For example, in the case where the prediction control unit 81 determines that a search range is limited to a range in which no upper reference pixels are referred to with respect to a certain chrominance component block, the predicted image generation unit 89 generates predicted images of the aforementioned block and an above-adjoining chrominance component block in a parallel manner. The two chrominance component blocks processed in parallel in this case are vertically adjoining chrominance component blocks corresponding to one luma component block. Then, the predicted image generation unit 89 outputs the generated predicted images to the addition section 65.

Note that the example in which whether or not the search range of intra-prediction modes has been limited during encoding is determined on the basis of limitation information that can be decoded from an encoded stream has been mainly described here. However, the prediction control unit 81 may determine whether or not the search range of intra-prediction modes has been limited on the basis of, for example, analysis of prediction mode information included in the encoded stream (e.g., whether there is at least one prediction mode in which an upper reference pixel is referred to, etc.), rather than using such limitation information.

<5. Flow of Process During Decoding>

Figure 17:
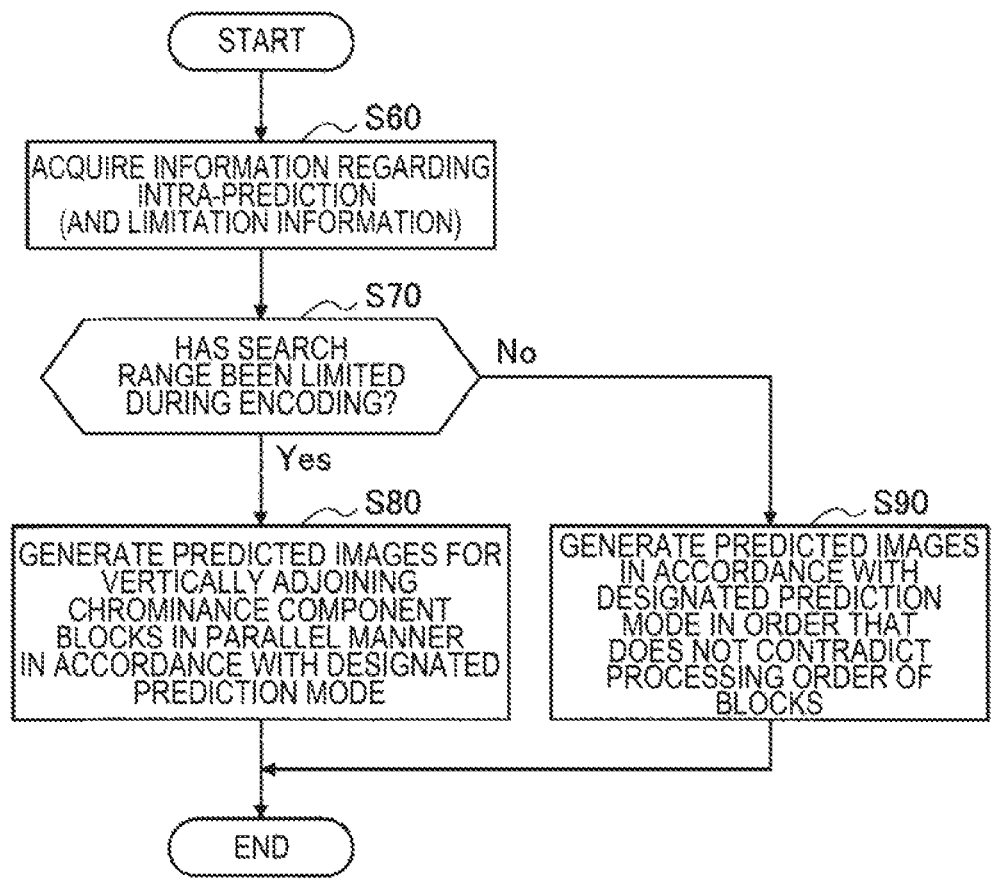
FIG. 17 is a flowchart showing an example of a flow of an intra-prediction process during decoding according to an embodiment.

FIG. 17 is a flowchart showing an example of a flow of an intra-prediction process during decoding according to an embodiment.

Referring to FIG. 17, the prediction control unit 81 first acquires information regarding intra-prediction and limitation information (if any) decoded by the lossless decoding section 62 (Step S60). The information regarding intra-prediction acquired here includes, for example, prediction mode information of luma components and chrominance components of each prediction block.

Next, the prediction control unit 81 determines whether or not a search range in which an intra-prediction mode is searched for has been limited to a predetermined range in which no upper reference pixels are referred to in relation to the fact that the chroma format is 4:2:2 in intra-prediction during encoding of an image (Step S70).

Then, the predicted image generation unit 89 generates predicted images for every two vertically adjoining chrominance component blocks corresponding to one luma component block among blocks for which the search range has been determined to be limited to the predetermined range in a parallel manner in accordance with a designated prediction mode (Step S80). In addition, the predicted image generation unit 89 generates predicted images for blocks for which the search range has not been limited in accordance with the designated prediction mode in a processing order that does not contradict the dependent relationship between the blocks (Step S80).

<6. Example of Hardware Configuration>

The above-described embodiment can be realized using any of software, hardware, and a combination of software and hardware. In the case where the encoder 10 or the decoder 60 uses software, a program that constitutes the software may be stored in, for example, a storage medium provided inside or outside the device (a non-transitory media) in advance. Then, each program is read by, for example, a random access memory (RAM) for its execution and executed by a processor such as a central processing unit (CPU).

Figure 18:
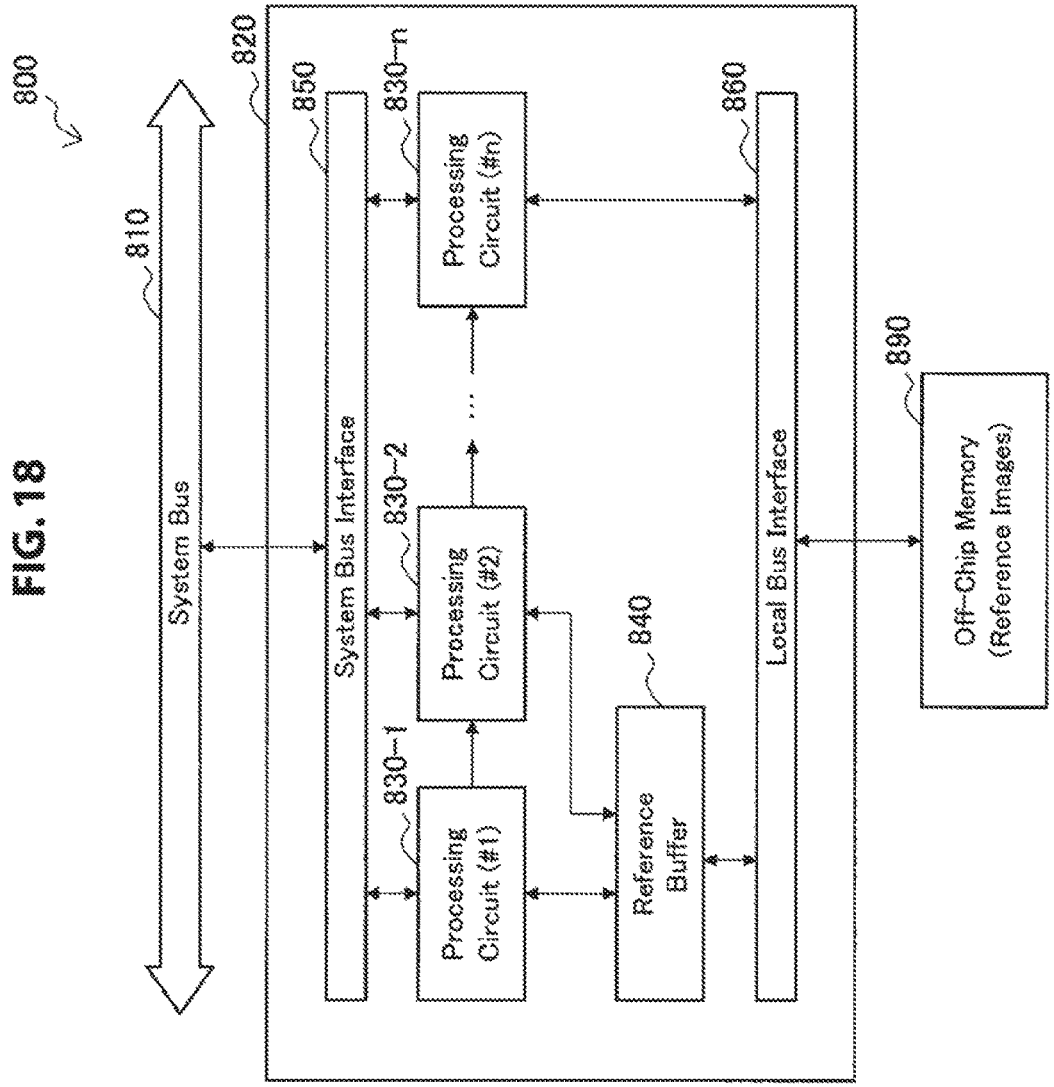
FIG. 18 is a block diagram illustrating an example of a hardware configuration of a device.

FIG. 18 is a block diagram illustrating an example of a hardware configuration of a device to which the above-described embodiment can be applied. Referring to FIG. 18, an image processing device 800 has a system bus 810, an image processing chip 820, and an off-chip memory 890. The image processing chip 820 includes n (n is equal to or greater than 1) processing circuits 830-1, 830-2, . . . , and 830-n, a reference buffer 840, a system bus interface 850, and a local bus interface 860.

The system bus 810 provides a communication path between the image processing chip 820 and an external module (e.g., a central control function, an application function, a communication interface, a user interface, etc.). The processing circuits 830-1, 830-2, . . . , and 830-n are connected to the system bus 810 via the system bus interface 850 and to the off-chip memory 890 via the local bus interface 860. The processing circuits 830-1, 830-2, . . . , and 830-n can also access the reference buffer 840 that can correspond to an on-chip memory (e.g., an SRAM). The off-chip memory 890 may be, for example, a frame memory that stores image data processed by the image processing chip 820. As an example, the processing circuits 830-1 and 830-2 are configured to be used for intra-prediction and generate predicted images of a plurality of blocks in a parallel manner. Note that these processing circuits may be formed on individual chips, rather than on the same image processing chip 820.

<7. Application Examples>

The encoder 10 and the decoder 60 according to the above-described embodiment can be applied to transmitters or receivers for satellite broadcasting, wired broadcasting such as cable TV, distribution on the Internet, distribution to terminals through cellular communication, recording devices which record images on media such as optical discs, magnetic disks, and flash memories, or various electronic apparatuses such as reproduction devices which reproduce images from the foregoing storage media. Four application examples will be described below.

(1) First Application Example

Figure 19:
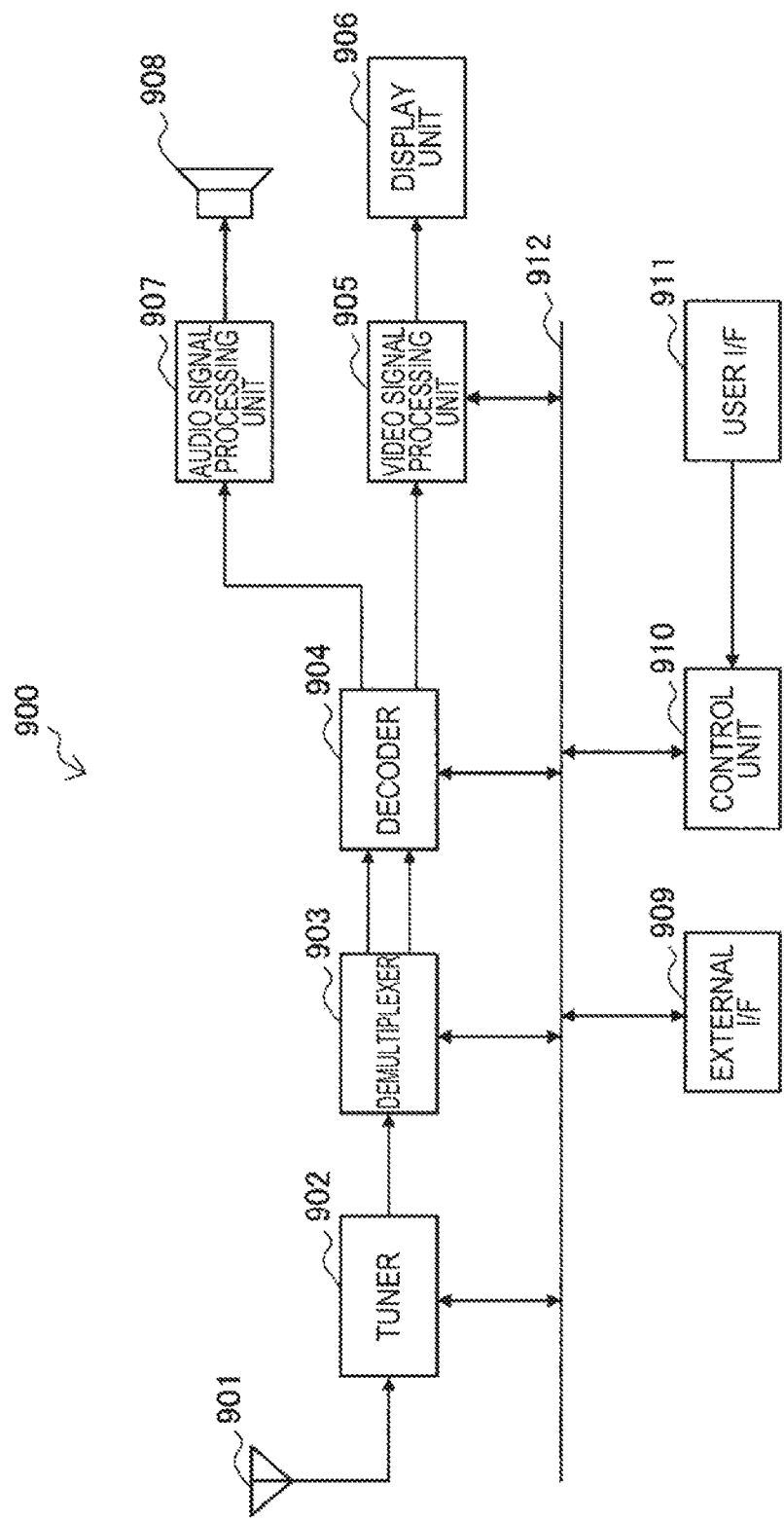
FIG. 19 is a block diagram illustrating an example of a schematic configuration of a television apparatus.

FIG. 19 illustrates an example of a schematic configuration of a television apparatus to which the above-described embodiment is applied. The television apparatus 900 has an antenna 901, a tuner 902, a demultiplexer 903, a decoder 904, a video signal processing unit 905, a display unit 906, an audio signal processing unit 907, a speaker 908, an external interface 909, a control unit 910, a user interface 911, and a bus 912.

The tuner 902 extracts a signal of a desired channel from a broadcasting signal received via the antenna 901 and demodulates the extracted signal. Then, the tuner 902 outputs an encoded bit stream obtained from the demodulation to the demultiplexer 903. That is, the tuner 902 plays a role as a transmission means of the television apparatus 900 which receives an encoded stream in which an image is encoded.

The demultiplexer 903 separates a video stream and an audio stream of a program to be viewed from the encoded stream and outputs the separated streams to the decoder 904. In addition, the demultiplexer 903 extracts auxiliary data such as an electronic program guide (EPG) from the encoded stream and supplies the extracted data to the control unit 910. Note that, in the case where the encoded bit stream has been scrambled, the demultiplexer 903 may perform descrambling.

The decoder 904 decodes the video stream and the audio stream input from the demultiplexer 903. Then, the decoder 904 outputs video data generated from the decoding process to the video signal processing unit 905. In addition, the decoder 904 outputs audio data generated from the decoding process to the audio signal processing unit 907.

The video signal processing unit 905 reproduces the video data input from the decoder 904 to cause the display unit 906 to display a video. In addition, the video signal processing unit 905 may cause the display unit 906 to display an application screen supplied via a network. Furthermore, the video signal processing unit 905 may perform an additional process, for example, noise reduction, on the video data in accordance with a setting. Moreover, the video signal processing unit 905 may generate an image of a graphical user interface (GUI), for example, a menu, a button, or a cursor and superimpose the generated image on an output image.

The display unit 906 is driven with a driving signal supplied from the video signal processing unit 905 and displays a video or an image on a video plane of a display device (e.g., a liquid crystal display, a plasma display, an OLED, etc.).

The audio signal processing unit 907 performs a reproduction process including D/A conversion and amplification on the audio data input from the decoder 904 and causes the speaker 908 to output a sound. In addition, the audio signal processing unit 907 may perform an additional process such as noise removal on the audio data.

The external interface 909 is an interface for connecting the television apparatus 900 to an external apparatus or a network. For example, a video stream or an audio stream received via the external interface 909 may be decoded by the decoder 904. In other words, the external interface 909 also plays the role as a transmission means of the television apparatus 900 which receives an encoded stream in which an image is encoded.

The control unit 910 has a processor such as a central processing unit (CPU) and a memory such as a random access memory (RAM) and a read only memory (ROM). The memory stores a program executed by the CPU, program data, EPG data, and data acquired via a network. The program stored in the memory is read and executed by the CPU at the time of, for example, start-up of the television apparatus 900. The CPU controls operations of the television apparatus 900 in accordance with, for example, operation signals input from the user interface 911 by executing a program.

The user interface 911 is connected to the control unit 910. The user interface 911 has, for example, a button and a switch with which a user operates the television apparatus 900, a reception unit for remote control signals, and the like. The user interface 911 generates operation signals by detecting operations of a user via the aforementioned constituent elements and outputs the generated operation signals to the control unit 910.

The bus 912 connects the tuner 902, the demultiplexer 903, the decoder 904, the video signal processing unit 905, the audio signal processing unit 907, the external interface 909, and the control unit 910 to one another.

The decoder 904 has the function of the decoder 60 according to the above-described embodiment in the television apparatus 900 configured as described above. Thus, the television apparatus 900 can improve decoding performance by shortening a processing delay in the intra-prediction process during decoding of an image.

(2) Second Application Example

Figure 20:
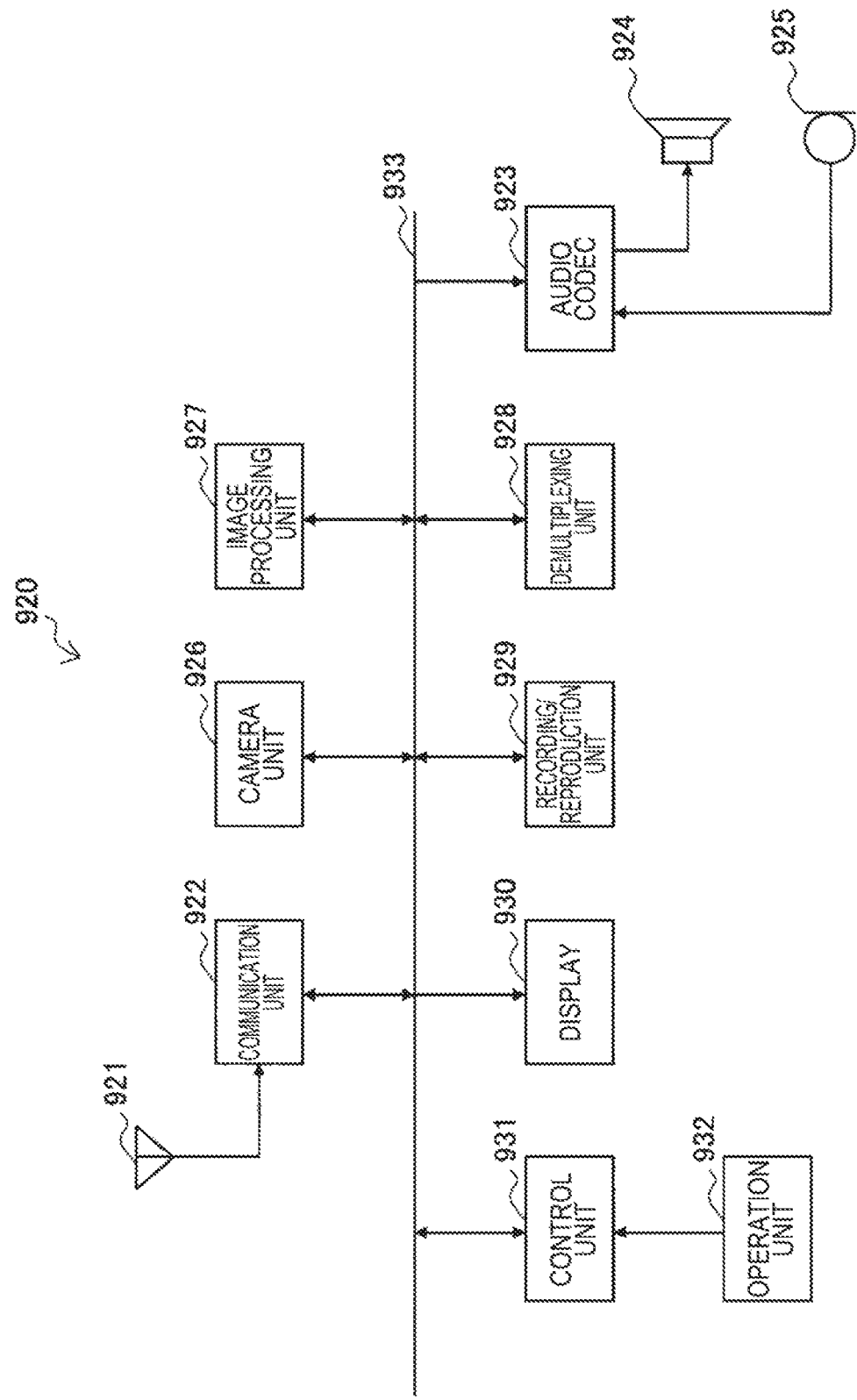
FIG. 20 is a block diagram illustrating an example of a schematic configuration of a mobile phone.

FIG. 20 is a diagram illustrating an example of a schematic configuration of a mobile telephone to which the above-described embodiment is applied. A mobile telephone 920 includes an antenna 921, a communication unit 922, an audio codec 923, a speaker 924, a microphone 925, a camera unit 926, an image processing unit 927, a demultiplexing unit 928, a recording/reproducing unit 929, a display 930, a control unit 931, an operation unit 932, and a bus 933.

The antenna 921 is connected to the communication unit 922. The speaker 924 and the microphone 925 are connected to the audio codec 923. The operation unit 932 is connected to the control unit 931. The bus 933mutually connects the communication unit 922, the audio codec 923, the camera unit 926, the image processing unit 927, the demultiplexing unit 928, the recording/reproducing unit 929, the display 930, and the control unit 931.

The mobile telephone 920 performs an operation such as transmitting/receiving an audio signal, transmitting/receiving an electronic mail or image data, imaging an image, or recording data in various operation modes including an audio call mode, a data communication mode, a photography mode, and a videophone mode.

In the audio call mode, an analog audio signal generated by the microphone 925 is supplied to the audio codec 923. The audio codec 923 then converts the analog audio signal into audio data, performs A/D conversion on the converted audio data, and compresses the data. The audio codec 923 thereafter outputs the compressed audio data to the communication unit 922. The communication unit 922 encodes and modulates the audio data to generate a transmission signal. The communication unit 922 then transmits the generated transmission signal to a base station (not shown) through the antenna 921. Furthermore, the communication unit 922 amplifies a radio signal received through the antenna 921, converts a frequency of the signal, and acquires a reception signal. The communication unit 922 thereafter demodulates and decodes the reception signal to generate the audio data and output the generated audio data to the audio codec 923. The audio codec 923 expands the audio data, performs D/A conversion on the data, and generates the analog audio signal. The audio codec 923 then outputs the audio by supplying the generated audio signal to the speaker 924.

In the data communication mode, for example, the control unit 931 generates character data configuring an electronic mail, in accordance with a user operation through the operation unit 932. The control unit 931 further displays a character on the display 930. Moreover, the control unit 931 generates electronic mail data in accordance with a transmission instruction from a user through the operation unit 932 and outputs the generated electronic mail data to the communication unit 922. The communication unit 922 encodes and modulates the electronic mail data to generate a transmission signal. Then, the communication unit 922 transmits the generated transmission signal to the base station (not shown) through the antenna 921. The communication unit 922 further amplifies a radio signal received through the antenna 921, converts a frequency of the signal, and acquires a reception signal. The communication unit 922 thereafter demodulates and decodes the reception signal, restores the electronic mail data, and outputs the restored electronic mail data to the control unit 931. The control unit 931 displays the content of the electronic mail on the display 930 as well as stores the electronic mail data in a storage medium of the recording/reproducing unit 929.

The recording/reproducing unit 929 includes an arbitrary storage medium that is readable and writable. For example, the storage medium may be a built-in storage medium such as a RAM or a flash memory, or may be an externally-mounted storage medium such as a hard disk, a magnetic disk, a magneto-optical disk, an optical disk, a USB (Unallocated Space Bitmap) memory, or a memory card.

In the photography mode, for example, the camera unit 926 images an object, generates image data, and outputs the generated image data to the image processing unit 927. The image processing unit 927 encodes the image data input from the camera unit 926 and stores an encoded stream in the storage medium of the recording/reproducing unit 929.

In the videophone mode, for example, the demultiplexing unit 928 multiplexes a video stream encoded by the image processing unit 927 and an audio stream input from the audio codec 923, and outputs the multiplexed stream to the communication unit 922. The communication unit 922 encodes and modulates the stream to generate a transmission signal. The communication unit 922 subsequently transmits the generated transmission signal to the base station (not shown) through the antenna 921. Moreover, the communication unit 922 amplifies a radio signal received through the antenna 921, converts a frequency of the signal, and acquires a reception signal. The transmission signal and the reception signal can include an encoded bit stream. Then, the communication unit 922 demodulates and decodes the reception signal to restore the stream, and outputs the restored stream to the demultiplexing unit 928. The demultiplexing unit 928 isolates the video stream and the audio stream from the input stream and outputs the video stream and the audio stream to the image processing unit 927 and the audio codec 923, respectively. The image processing unit 927 decodes the video stream to generate video data. The video data is then supplied to the display 930, which displays a series of images. The audio codec 923 expands and performs D/A conversion on the audio stream to generate an analog audio signal. The audio codec 923 then supplies the generated audio signal to the speaker 924 to output the audio.

The image processing unit 927 has the functions of the encoder 10 and the decoder 60 according to the above-described embodiment in the mobile telephone 920 configured as described above. Thus, the mobile telephone 920 can improve encoding or decoding performance by shortening a processing delay in an intra-prediction process during encoding or decoding of an image.

(3) Third Application Example

Figure 21:
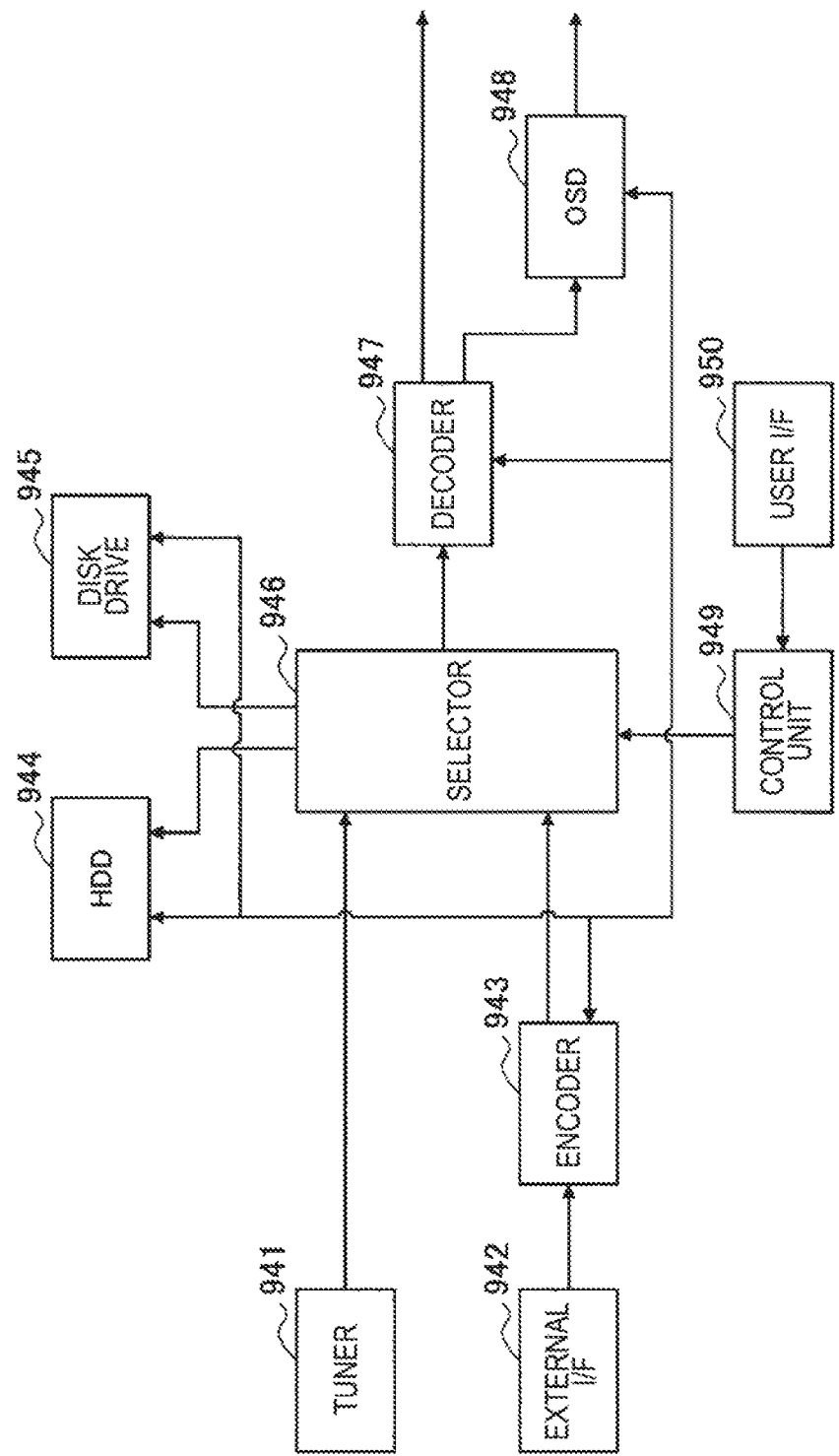
FIG. 21 is a block diagram illustrating an example of a schematic configuration of a recording/reproduction device.

FIG. 21 is a diagram illustrating an example of a schematic configuration of a recording/reproducing device to which the above-described embodiment is applied. A recording/reproducing device 940 encodes audio data and video data of a broadcast program received and records the data into a recording medium, for example. The recording/reproducing device 940 may also encode audio data and video data acquired from another device and record the data into the recording medium, for example. In response to a user instruction, for example, the recording/reproducing device 940 reproduces the data recorded in the recording medium on a monitor and a speaker. The recording/reproducing device 940 at this time decodes the audio data and the video data.

The recording/reproducing device 940 includes a tuner 941, an external interface 942, an encoder 943, an HDD (Hard Disk Drive) 944, a disk drive 945, a selector 946, a decoder 947, an OSD (On-Screen Display) 948, a control unit 949, and a user interface 950.

The tuner 941 extracts a signal of a desired channel from a broadcast signal received through an antenna (not shown) and demodulates the extracted signal. The tuner 941 then outputs an encoded bit stream obtained by the demodulation to the selector 946. That is, the tuner 941 has a role as transmission means in the recording/reproducing device 940.

The external interface 942 is an interface which connects the recording/reproducing device 940 with an external device or a network. The external interface 942 may be, for example, an IEEE 1394 interface, a network interface, a USB interface, or a flash memory interface. The video data and the audio data received through the external interface 942 are input to the encoder 943, for example. That is, the external interface 942 has a role as transmission means in the recording/reproducing device 940.

The encoder 943 encodes the video data and the audio data in the case where the video data and the audio data input from the external interface 942 are not encoded. The encoder 943 thereafter outputs an encoded bit stream to the selector 946.

The HDD 944 records, into an internal hard disk, the encoded bit stream in which content data such as video and audio is compressed, various programs, and other data. The HDD 944 reads these data from the hard disk when reproducing the video and the audio.

The disk drive 945 records and reads data into/from a recording medium which is mounted to the disk drive. The recording medium mounted to the disk drive 945 may be, for example, a DVD disk (such as DVD-Video, DVD-RAM, DVD-R, DVD-RW, DVD+R, or DVD+RW) or a Blu-ray (Registered Trademark) disk.

The selector 946 selects the encoded bit stream input from the tuner 941 or the encoder 943 when recording the video and audio, and outputs the selected encoded bit stream to the HDD 944 or the disk drive 945. When reproducing the video and audio, on the other hand, the selector 946 outputs the encoded bit stream input from the HDD 944 or the disk drive 945 to the decoder 947.

The decoder 947 decodes the encoded bit stream to generate the video data and the audio data. The decoder 904 then outputs the generated video data to the OSD 948 and the generated audio data to an external speaker.

The OSD 948 reproduces the video data input from the decoder 947 and displays the video. The OSD 948 may also superpose an image of a GUI such as a menu, a button, or a cursor onto the video displayed.

The control unit 949 includes a processor such as a CPU and a memory such as a RAM and a ROM. The memory stores a program executed by the CPU as well as program data. The program stored in the memory is read by the CPU at the start-up of the recording/reproducing device 940 and executed, for example. By executing the program, the CPU controls the operation of the recording/reproducing device 940 in accordance with an operation signal that is input from the user interface 950, for example.

The user interface 950 is connected to the control unit 949. The user interface 950 includes a button and a switch for a user to operate the recording/reproducing device 940 as well as a reception part which receives a remote control signal, for example. The user interface 950 detects a user operation through these components, generates the operation signal, and outputs the generated operation signal to the control unit 949.

The encoder 943 has the function of the encoder 10 according to the above-described embodiment in the recording/reproducing device 940 having the above configuration. In addition, the decoder 947 has the function of the decoder 60 according to the above-described embodiment. Thus, the recording/reproducing device 940 can improve encoding or decoding performance by shortening a processing delay in an intra-prediction process during encoding or decoding of an image.

(4) Fourth Application Example

FIG. 22 shows an example of a schematic configuration of an imaging device to which the above-described embodiment is applied. An imaging device 960 images an object, generates an image, encodes image data, and records the data into a recording medium.

The imaging device 960 includes an optical block 961, an imaging unit 962, a signal processing unit 963, an image processing unit 964, a display unit 965, an external interface 966, a memory 967, a media drive 968, an OSD 969, a control unit 970, a user interface 971, and a bus 972.

The optical block 961 is connected to the imaging unit 962. The imaging unit 962 is connected to the signal processing unit 963. The display unit 965 is connected to the image processing unit 964. The user interface 971 is connected to the control unit 970. The bus 972 mutually connects the image processing unit 964, the external interface 966, the memory 967, the media drive 968, the OSD 969, and the control unit 970.

The optical block 961 includes a focus lens and a diaphragm mechanism. The optical block 961 forms an optical image of the object on an imaging surface of the imaging unit 962. The imaging unit 962 includes an image sensor such as a CCD (Charge Coupled Device) or a CMOS (Complementary Metal Oxide Semiconductor) and performs photoelectric conversion to convert the optical image formed on the imaging surface into an image signal as an electric signal. Subsequently, the imaging unit 962 outputs the image signal to the signal processing unit 963.

The signal processing unit 963 performs various camera signal processes such as a knee correction, a gamma correction and a color correction on the image signal input from the imaging unit 962. The signal processing unit 963 outputs the image data, on which the camera signal process has been performed, to the image processing unit 964.

The image processing unit 964 encodes the image data input from the signal processing unit 963 and generates the encoded data. The image processing unit 964 then outputs the generated encoded data to the external interface 966 or the media drive 968. The image processing unit 964 also decodes the encoded data input from the external interface 966 or the media drive 968 to generate image data. The image processing unit 964 then outputs the generated image data to the display unit 965. Moreover, the image processing unit 964 may output to the display unit 965 the image data input from the signal processing unit 963 to display the image. Furthermore, the image processing unit 964 may superpose display data acquired from the OSD 969 onto the image that is output on the display unit 965.

The OSD 969 generates an image of a GUI such as a menu, a button, or a cursor and outputs the generated image to the image processing unit 964.

The external interface 966 is configured as a USB input/output terminal, for example. The external interface 966 connects the imaging device 960 with a printer when printing an image, for example. Moreover, a drive is connected to the external interface 966 as needed. A removable medium such as a magnetic disk or an optical disk is mounted to the drive, for example, so that a program read from the removable medium can be installed to the imaging device 960. The external interface 966 may also be configured as a network interface that is connected to a network such as a LAN or the Internet. That is, the external interface 966 has a role as transmission means in the imaging device 960.

The recording medium mounted to the media drive 968 may be an arbitrary removable medium that is readable and writable such as a magnetic disk, a magneto-optical disk, an optical disk, or a semiconductor memory. Furthermore, the recording medium may be fixedly mounted to the media drive 968 so that a non-transportable storage unit such as a built-in hard disk drive or an SSD (Solid State Drive) is configured, for example.

The control unit 970 includes a processor such as a CPU and a memory such as a RAM and a ROM. The memory stores a program executed by the CPU as well as program data. The program stored in the memory is read by the CPU at the start-up of the imaging device 960 and then executed. By executing the program, the CPU controls the operation of the imaging device 960 in accordance with an operation signal that is input from the user interface 971, for example.

The user interface 971 is connected to the control unit 970. The user interface 971 includes a button and a switch for a user to operate the imaging device 960, for example. The user interface 971 detects a user operation through these components, generates the operation signal, and outputs the generated operation signal to the control unit 970.

The image processing unit 964 has the functions of the encoder 10 and the decoder 60 according to the above-described embodiment in the imaging device 960 configured as described above. Thus, the imaging device 960 can improve encoding or decoding performance by shortening a processing delay in an intra-prediction process during encoding or decoding of an image.

<8. Conclusion>

Embodiments of the technology according to the present disclosure have been described so far in detail using FIGS. 1 to 22. According to the above-described embodiments, a search range in which an intra-prediction mode is searched for with respect to a prediction block of chrominance components included in an image to be encoded is limited to a predetermined range in which no upper reference pixels are referred to in the case where a chroma format is determined to be 4:2:2. The predetermined range mentioned here typically includes one or more intra-prediction modes in which a reference pixel to the immediate left of a pixel of interest or a reference pixel positioned below the immediate left thereof is referred to. As a result of such limitation, when there is no dependent relationship between two vertically adjoining chrominance component blocks corresponding to one luma component block in the case where the chroma format is 4:2:2, the relationship in which a decoded pixel value of one block is referred to for generation of a predicted image of the other block. Thus, predicted images of the two chrominance component blocks can be generated in a parallel manner, thus a processing delay is eliminated, and encoding and decoding performance is improved.

Furthermore, according to the above-described embodiments, limitation of the search range of intra-prediction modes for chrominance components can be effectuated or nullified in accordance with an additional condition such as whether or not the left side of a block adjoins a picture boundary or a slice boundary, whether or not a TU size exceeds a threshold value, or whether a CTU is positioned at a place selected according to a specific rule. Accordingly, it is possible to flexibly find a solution to a tradeoff between improvement in encoding and decoding performance and subjective image quality suitable for an application of a device or a condition of a user.

The terms CTU, CU, PU, and TU described in the present specification may be interchanged with terms CTB, CB, PB, and TB, respectively. While CTB, CB, PB, and TB primarily means individual blocks (or sub blocks) of respective color components as parts of an image, CTU, CU, PU, and TU primarily means logical units that include a plurality of color components and associated syntax.

Mainly described herein is the example where the various pieces of information such as information regarding intra-prediction and limitation information are multiplexed to the header of the encoded stream and transmitted from the encoding side to the decoding side. The method of transmitting these pieces of information however is not limited to such example. For example, these pieces of information may be transmitted or recorded as separate data associated with the encoded bit stream without being multiplexed to the encoded bit stream. Here, the term "association" means to allow the image included in the bit stream (may be a part of the image such as a slice or a block) and the information corresponding to the current image to establish a link when decoding. Namely, the information may be transmitted on a different transmission path from the image (or the bit stream). The information may also be recorded in a different recording medium (or a different recording area in the same recording medium) from the image (or the bit stream). Furthermore, the information and the image (or the bit stream) may be associated with each other by an arbitrary unit such as a plurality of frames, one frame, or a portion within a frame.

The preferred embodiment(s) of the present disclosure has/have been described above with reference to the accompanying drawings, whilst the present disclosure is not limited to the above examples. A person skilled in the art may find various alterations and modifications within the scope of the appended claims, and it should be understood that they will naturally come under the technical scope of the present disclosure.

In addition, the effects described in the present specification are merely illustrative and demonstrative, and not limitative. In other words, the technology according to the present disclosure can exhibit other effects that are evident to those skilled in the art along with or instead of the effects based on the present specification.

Additionally, the present technology may also be configured as below.

(1)

An image processing device including:

a search unit configured to search for an intra-prediction mode for each prediction block included in an image to be encoded; and a control unit configured to determine whether a chroma format is 4:2:2 and to limit a search range of intra-prediction modes of the search unit to a predetermined range in which no upper reference pixels are referred to with respect to a prediction block of chrominance components in a case where the chroma format is determined to be 4:2:2.

(2)

The image processing device according to (1), in which the control unit does not limit the search range for the prediction block to the predetermined range in a case where the left side of the prediction block adjoins a boundary of a picture or a slice.

(3) The image processing device according to (1) or (2), in which the control unit does not limit the search range to the predetermined range in a case where a transform unit (TU) size exceeds a pre-defined threshold value.

(4) The image processing device according to any one of (1) to (3), in which the control unit limits the search range to the predetermined range only for a subset of coding tree units (CTUs) selected among CTUs constituting the image in accordance with a certain rule.

(5) The image processing device according to any one of (1) to (4), in which the control unit controls whether or not the search range is to be limited to the predetermined range on the basis of at least one of a resolution and a frame rate of the image.

(6) The image processing device according to any one of (1) to (5), in which the control unit effectuates the limitation of the search range in a case where the image is encoded in a high efficiency video coding (HEVC) scheme.

(7) The image processing device according to any one of (1) to (6), in which the predetermined range includes one or more intra-prediction modes in which a reference pixel to the immediate left of a pixel of interest or a reference pixel positioned below the immediate left of the pixel of interest is referred to.

(8) The image processing device according to any one of (1) to (7), further including:
a generation unit configured to generate predicted images of two vertically adjoining chrominance component blocks corresponding to one luma component block in a parallel manner in a case where the control unit limits the search range to the predetermined range.

(9) An image processing method including:
determining whether a chroma format is 4:2:2 for an image to be encoded;
searching for an intra-prediction mode for each prediction block included in the image on the basis of a result of the determination; and
limiting a search range of intra-prediction modes in the searching to a predetermined range in which no upper reference pixels are referred to with respect to a prediction block of chrominance components in a case where the chroma format is determined to be 4:2:2.

(10) A program for causing a computer that controls an image processing device to function as:
a search unit configured to search for an intra-prediction mode for each prediction block included in an image to be encoded; and
a control unit configured to determine whether a chroma format is 4:2:2 and to limit a search range of intra-prediction modes of the search unit to a predetermined range in which no upper reference pixels are referred to with respect to a prediction block of chrominance components in a case where the chroma format is determined to be 4:2:2.

(11) A computer-readable recording medium on which the program according to (10) is recorded.

(12) An image processing device including:
a control unit configured to determine whether a search range in which an intra-prediction mode is searched for has been limited to a predetermined range in which no upper reference pixels are referred to in relation to the fact that a chroma format is 4:2:2 in intra-prediction during encoding of an image; and
a generation unit configured to generate predicted images of two vertically adjoining chrominance component blocks corresponding to one luma component block in a parallel manner in intra-prediction during decoding of the image in a case where the search range is determined to have been limited to the predetermined range.

REFERENCE SIGNS LIST 1 image processing system
10 image processing device (encoder)
16 lossless encoding section
30 intra-prediction section
31 prediction control unit
33 reference pixel setting unit
35 search unit
37 determination unit
39 predicted image generation unit
60 image processing device (decoder)
62 lossless decoding section
80 intra-prediction section
81 prediction control unit
83 reference pixel setting unit
89 predicted image generation unit

The invention claimed is:

1. An image processing device, comprising:
a search unit that searches for an intra-prediction mode for each prediction block included in an image to be encoded; and
a control unit that determines whether a chroma format is 4:2:2 and to limit a search range of intra-prediction modes of the search unit to a predetermined range in which no upper reference pixels are referred to with respect to a prediction block of chrominance components in a case where the chroma format is determined to be 4:2:2.

2. The image processing device according to claim 1, wherein the control unit does not limit the search range for the prediction block to the predetermined range in a case where the left side of the prediction block adjoins a boundary of a picture or a slice.

3. The image processing device according to claim 1, wherein the control unit does not limit the search range to the predetermined range in a case where a transform unit (TU) size exceeds a pre-defined threshold value.

4. The image processing device according to claim 1, wherein the control unit limits the search range to the predetermined range only for a subset of coding tree units (CTUs) selected among CTUs constituting the image in accordance with a certain rule, by interspersing CTUs for which the search range should be limited.

5. The image processing device according to claim 1, wherein the control unit controls whether or not the search range is to be limited to the predetermined range on the basis of at least one of a resolution and a frame rate of the image.

6. The image processing device according to claim 1, wherein the control unit effectuates the limitation of the search range in a case where the image is encoded in a high efficiency video coding (HEVC) scheme.

7. The image processing device according to claim 1, wherein the predetermined range includes one or more intra-prediction modes in which a reference pixel to the immediate left of a pixel of interest or a reference pixel positioned below the immediate left of the pixel of interest is referred to.

8. The image processing device according to claim 1, further comprising:
a generation unit that generates predicted images of two vertically adjoining chrominance component blocks corresponding to one luma component block in a parallel manner in a case where the control unit limits the search range to the predetermined range.

9. An image processing method, comprising:
in a processor:
determining whether a chroma format is 4:2:2 for an image to be encoded;
searching for an intra-prediction mode for each prediction block included in the image on the basis of a result of the determination; and
limiting a search range of intra-prediction modes in the searching to a predetermined range in which no upper reference pixels are referred to with respect to a prediction block of chrominance components in a case where the chroma format is determined to be 4:2:2.

10. A non-transitory computer-readable medium having stored thereon computer-executable instructions which when executed by a processor in an image processing device, causes the image processing device to execute operations, the operations comprising:
searching for an intra-prediction mode for each prediction block included in an image to be encoded; and
determining whether a chroma format is 4:2:2 and to limit a search range of intra-prediction modes of the search unit to a predetermined range in which no upper reference pixels are referred to with respect to a prediction block of chrominance components in a case where the chroma format is determined to be 4:2:2.

11. An image processing device, comprising:
a control unit that determines whether a search range in which an intra-prediction mode is searched for has been limited to a predetermined range in which no upper reference pixels are referred to in relation to the fact that a chroma format is 4:2:2 in intra-prediction during encoding of an image; and
a generation unit that generates predicted images of two vertically adjoining chrominance component blocks corresponding to one luma component block in a parallel manner in intra-prediction during decoding of the image in a case where the search range is determined to have been limited to the predetermined range.

* * * * *